(12) United States Patent
Onda et al.

(10) Patent No.: US 11,216,836 B2
(45) Date of Patent: Jan. 4, 2022

(54) COMPUTER SYSTEM, GAME SYSTEM, AND GAME DEVICE

(71) Applicant: BANDAI NAMCO Entertainment Inc., Tokyo (JP)

(72) Inventors: Akio Onda, Warabi (JP); Daisuke Omori, Tokyo (JP); Makoto Kikuchi, Tokyo (JP); Yuki Matsuba, Kawasaki (JP); Masayuki Oda, Fujisawa (JP); Tatsuya Shioiri, Funabashi (JP)

(73) Assignee: BANDAI NAMCO Entertainment Inc., Tokyo (JP)

(*) Notice: Subject to any disclaimer, the term of this patent is extended or adjusted under 35 U.S.C. 154(b) by 372 days.

(21) Appl. No.: 15/835,818

(22) Filed: Dec. 8, 2017

(65) Prior Publication Data
US 2018/0165700 A1 Jun. 14, 2018

(30) Foreign Application Priority Data

Dec. 9, 2016 (JP) .............................. JP2016-239346

(51) Int. Cl.
*G06Q 30/00* (2012.01)
*G06Q 30/02* (2012.01)
(Continued)

(52) U.S. Cl.
CPC ......... *G06Q 30/0209* (2013.01); *A63F 13/30* (2014.09); *A63F 13/53* (2014.09);
(Continued)

(58) Field of Classification Search
CPC .......... A63F 13/30; A63F 13/53; A63F 13/61; A63F 13/792; A63F 13/789; A63F 13/69; G09F 19/00
See application file for complete search history.

(56) References Cited

U.S. PATENT DOCUMENTS

2003/0172376 A1* 9/2003 Coffin, III .............. G06Q 30/02 725/22
2004/0015998 A1 1/2004 Bokor et al.
(Continued)

FOREIGN PATENT DOCUMENTS

JP 2002-159757 A 6/2002
JP 2003-529093 A 9/2003
(Continued)

OTHER PUBLICATIONS

"The time of Rewarded Videos is coming", Application which has eCPM of 500 yen-3,000 yen, and also accounts 30 percent of sales. SSP "Mr. Adofuri" tells three tips earned by Rewarded Videos., AppMarketingLabo [online], Sep. 14, 2015, [Jul. 9, 2018 search], URL: https://appmarketinglabo.ne1Jadfuri:videoads/ ((English translation of pp. 4 to 8).
(Continued)

*Primary Examiner* — Alvin L Brown
(74) *Attorney, Agent, or Firm* — Posz Law Group, PLC

(57) ABSTRACT

A computer system performs display control to display a reward advertisement at a given screen switching timing, a screen switching timing due to start or end of a game progress unit, or a timing at which a game progression satisfies a given change condition. The computer system gives a reward for watching the advertisement to a player. The reward is set based on user data and/or play data of the player related to the game.

12 Claims, 36 Drawing Sheets

(51) Int. Cl.

| | | |
|---|---|---|
| *A63F 13/798* | (2014.01) | |
| *A63F 13/53* | (2014.01) | |
| *A63F 13/792* | (2014.01) | |
| *G09F 19/00* | (2006.01) | |
| *A63F 13/79* | (2014.01) | |
| *A63F 13/30* | (2014.01) | |
| *A63F 13/61* | (2014.01) | |
| *A63F 13/69* | (2014.01) | |

(52) U.S. Cl.
CPC .............. *A63F 13/61* (2014.09); *A63F 13/79* (2014.09); *A63F 13/792* (2014.09); *A63F 13/798* (2014.09); *G06Q 30/0235* (2013.01); *G06Q 30/0239* (2013.01); *G09F 19/00* (2013.01); *A63F 13/69* (2014.09)

(56) References Cited

U.S. PATENT DOCUMENTS

| | | | |
|---|---|---|---|
| 2011/0106628 A1* | 5/2011 | Nam | G06Q 30/0269 705/14.66 |
| 2011/0264503 A1 | 10/2011 | Lenahan et al. | |
| 2012/0022944 A1* | 1/2012 | Volpi | G06Q 30/0268 705/14.53 |
| 2014/0243072 A1* | 8/2014 | Santini | G07F 17/3255 463/20 |
| 2016/0275560 A1 | 9/2016 | Ito et al. | |
| 2017/0178194 A1 | 6/2017 | Nagasaka et al. | |
| 2018/0068526 A1* | 3/2018 | Burgin | G07F 17/3255 |
| 2018/0165700 A1 | 6/2018 | Onda et al. | |
| 2018/0165701 A1 | 6/2018 | Onda et al. | |

FOREIGN PATENT DOCUMENTS

| | | |
|---|---|---|
| JP | 2004-302231 A | 10/2004 |
| JP | 2014-099111 A | 5/2014 |
| JP | 2015-008988 A | 1/2015 |
| JP | 2016-051440 A | 4/2016 |
| JP | 2016-076046 A | 5/2016 |
| JP | 2018-093962 A | 6/2018 |
| WO | 01/39067 A1 | 5/2001 |
| WO | 2016/052432 A1 | 4/2016 |

OTHER PUBLICATIONS

"The time of Rewarded Videos is coming", Application which has eCPM of 500 yen-3,000 yen, and also accounts 30 percent of sales. SSP "Mr. Adofuri" tells three tips earned by Rewarded Videos., AppMarketingLabo [online], Sep. 14, 2015, [Jan. 21, 2019 search] URL:https://appmarketinglabo.net/adfuri-videoads/ (and English Translation of p. 2).

Office Action dated Aug. 9, 2021 issued in related U.S. Appl. No. 17/005,874.

* cited by examiner

[FIG.1]
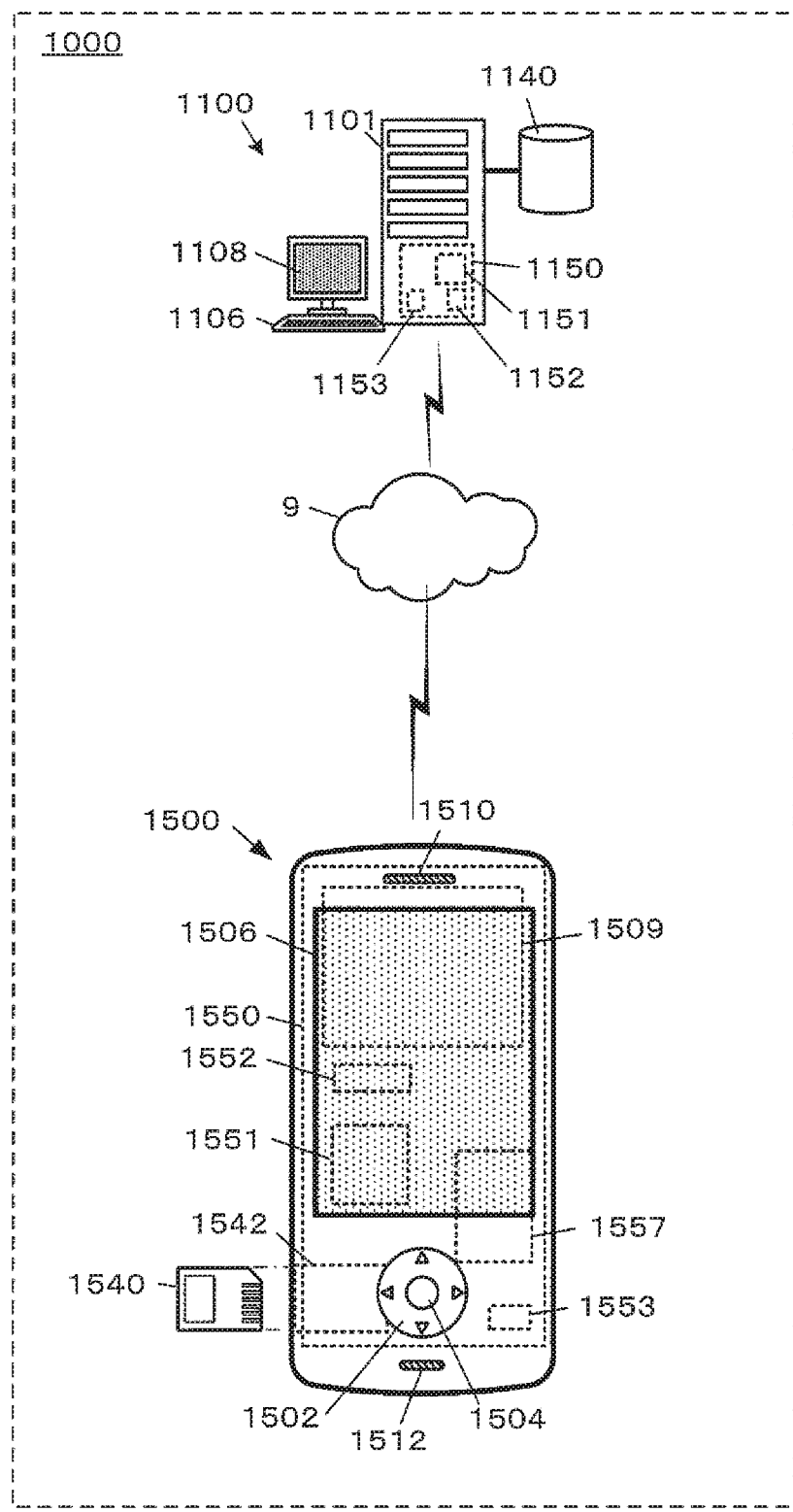

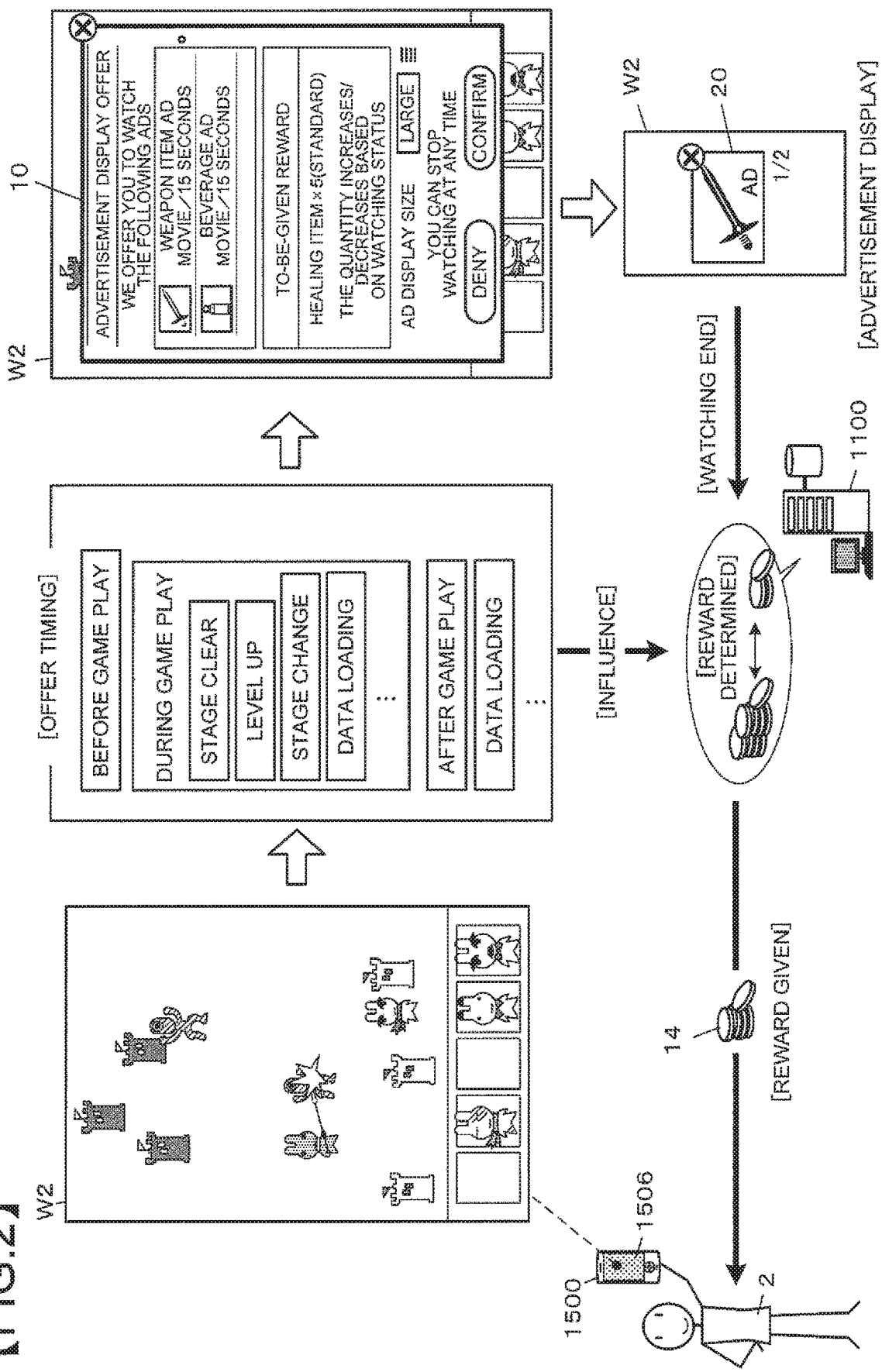

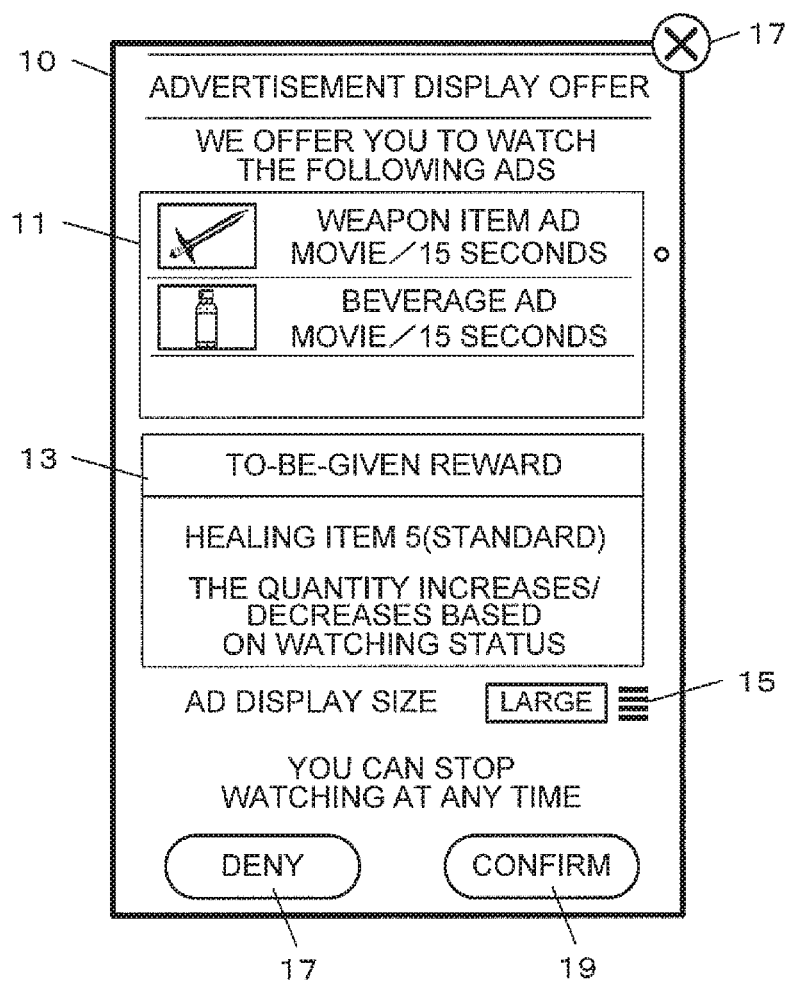

[FIG.4]
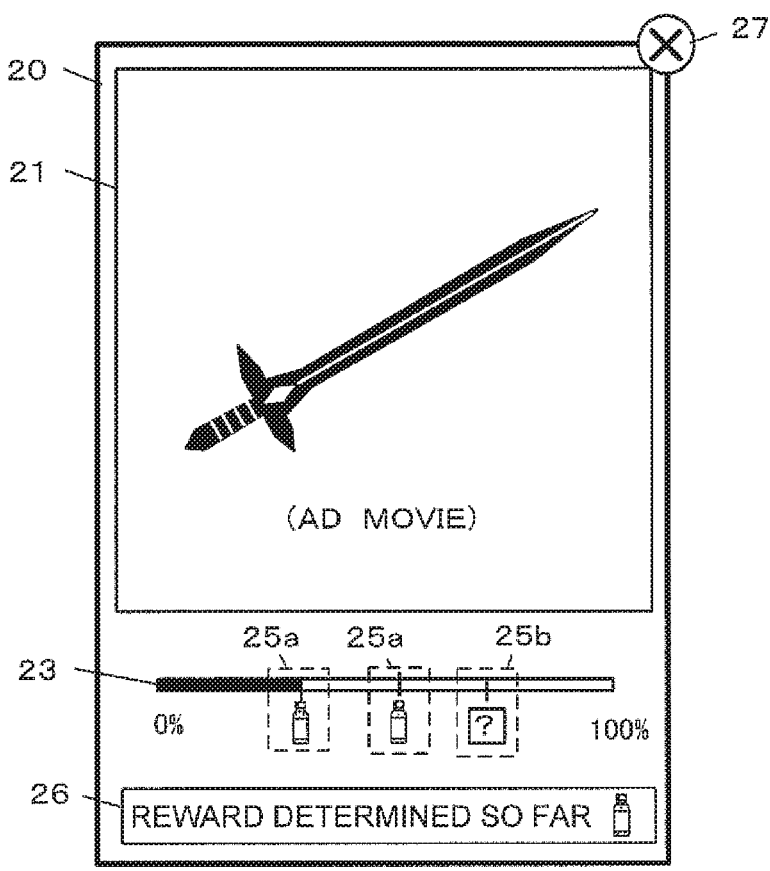

[FIG.5]
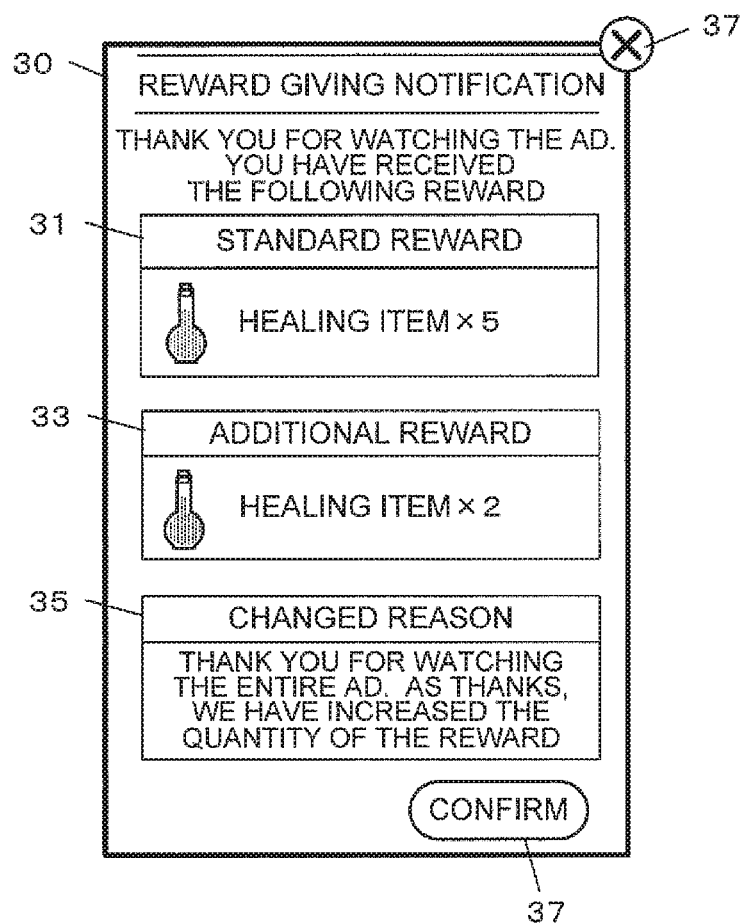

[FIG.6]
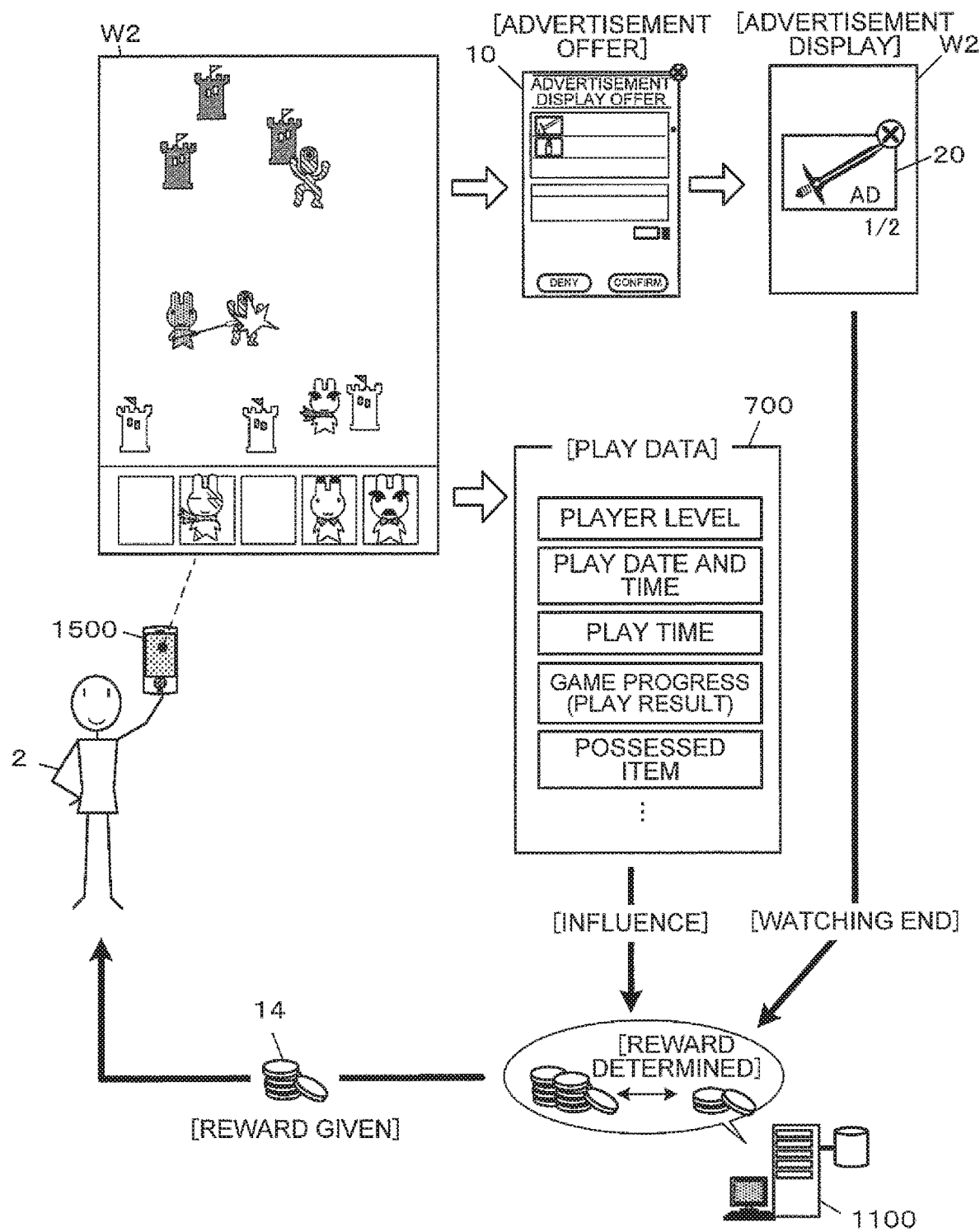

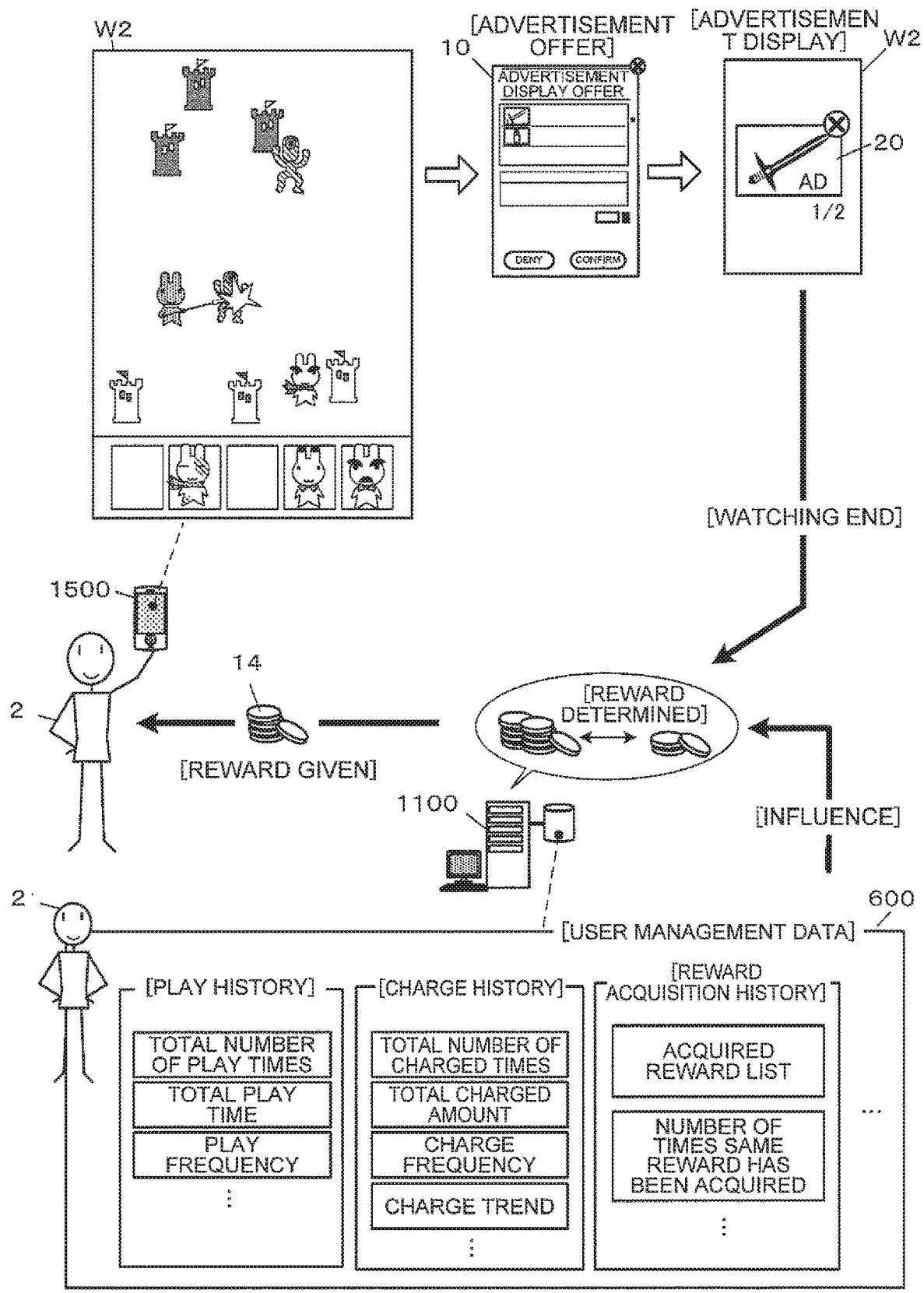
[FIG.7]

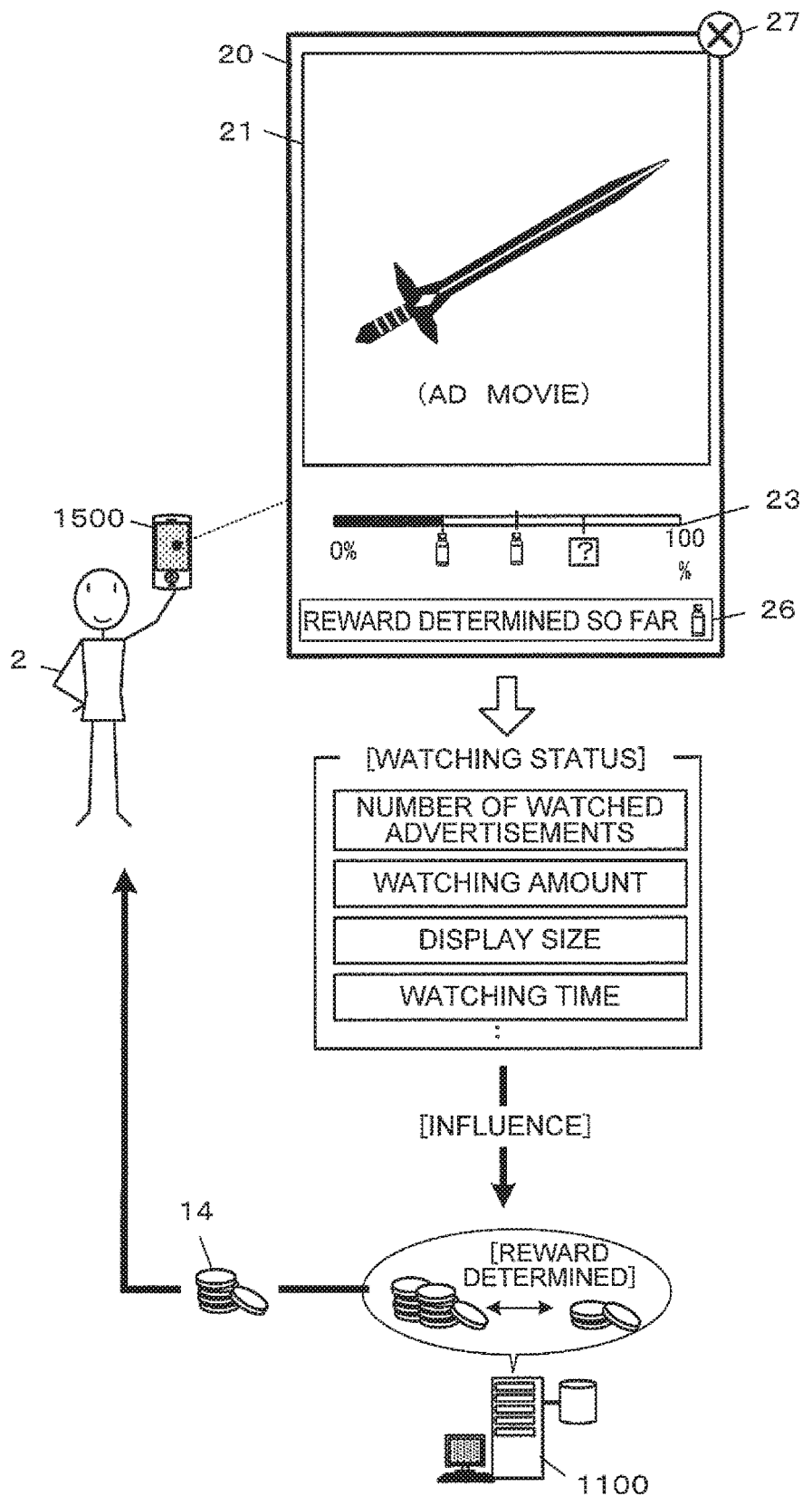
[FIG.8]

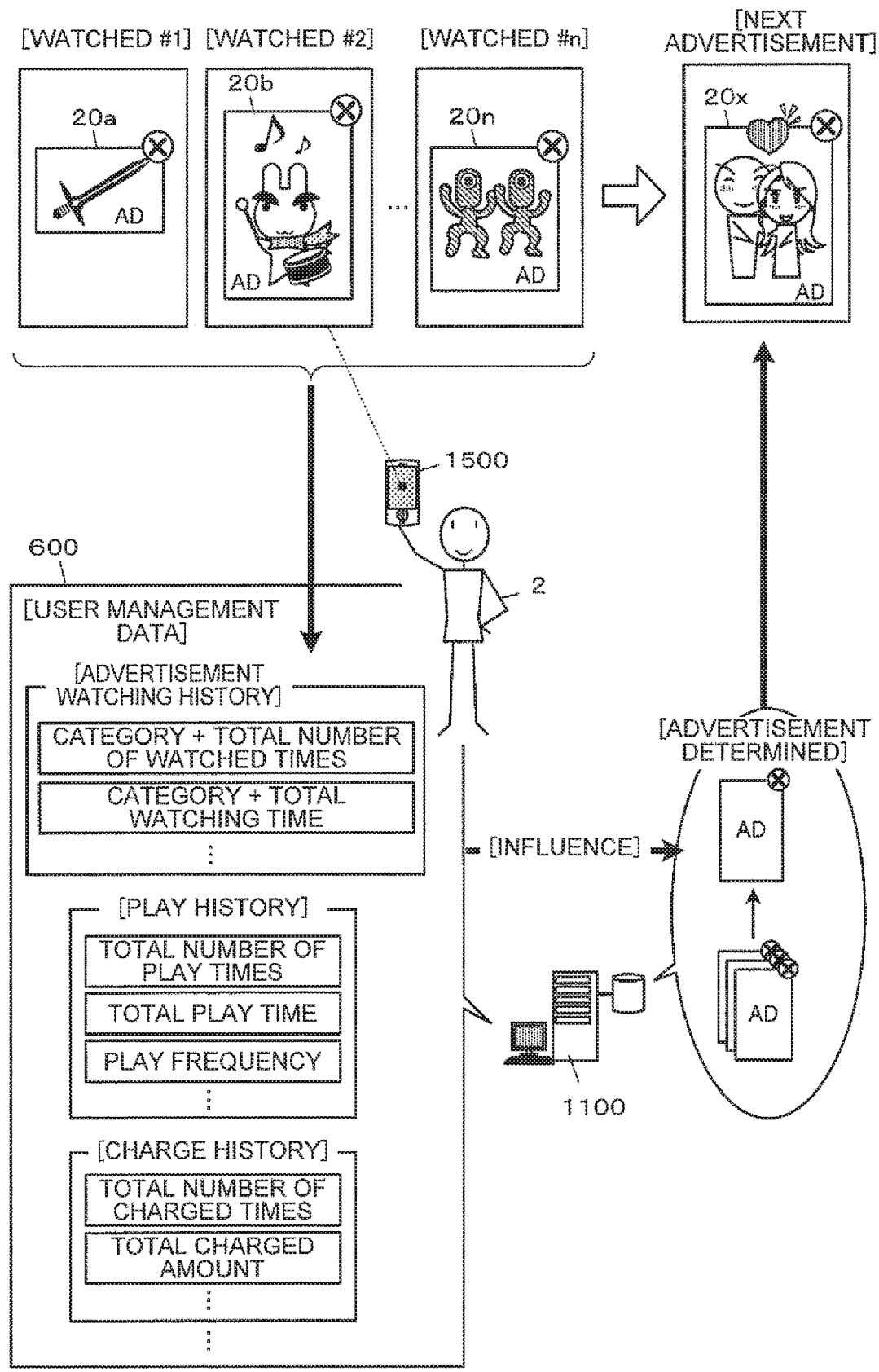

[FIG.10]
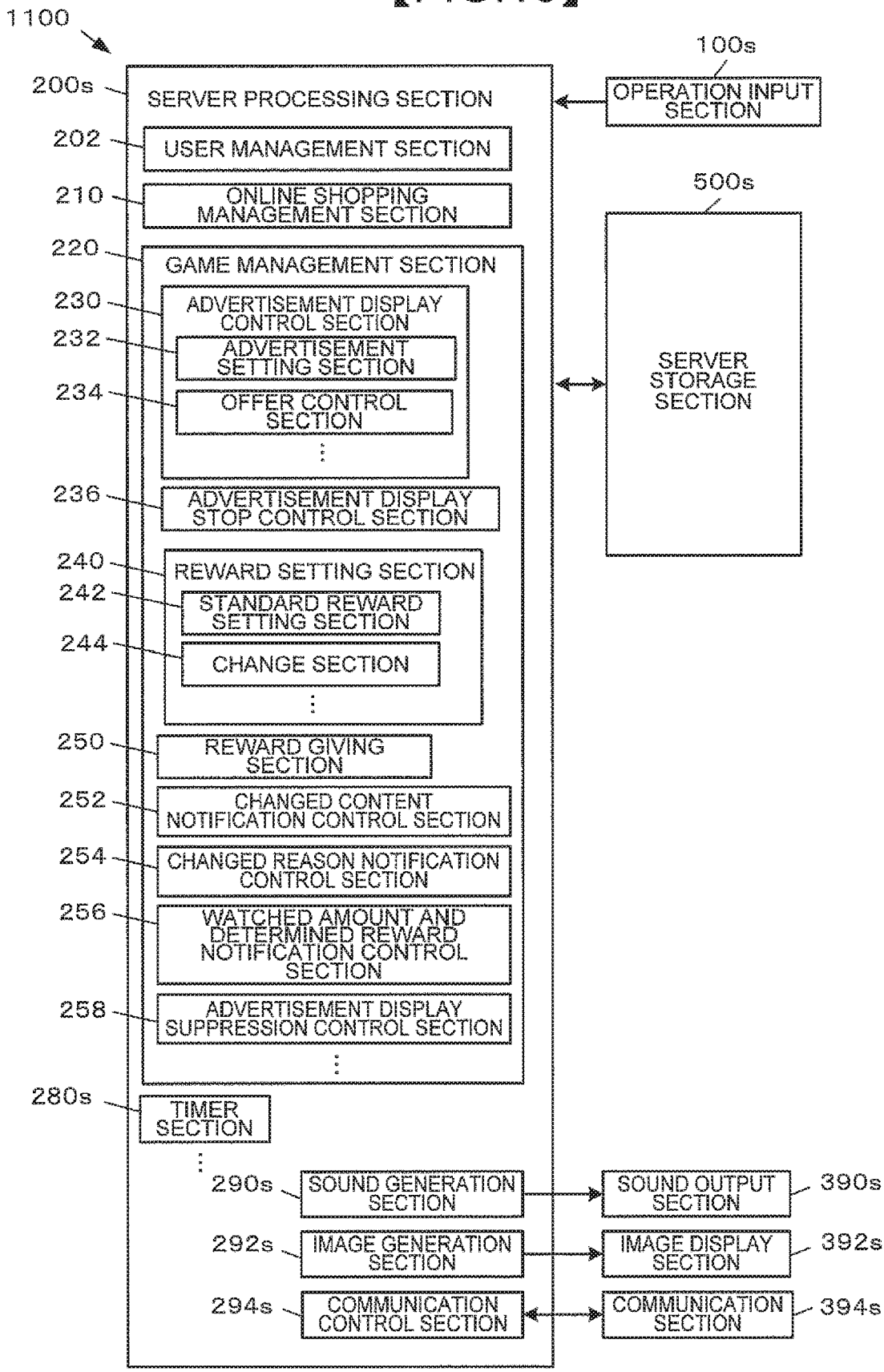

[FIG.11]
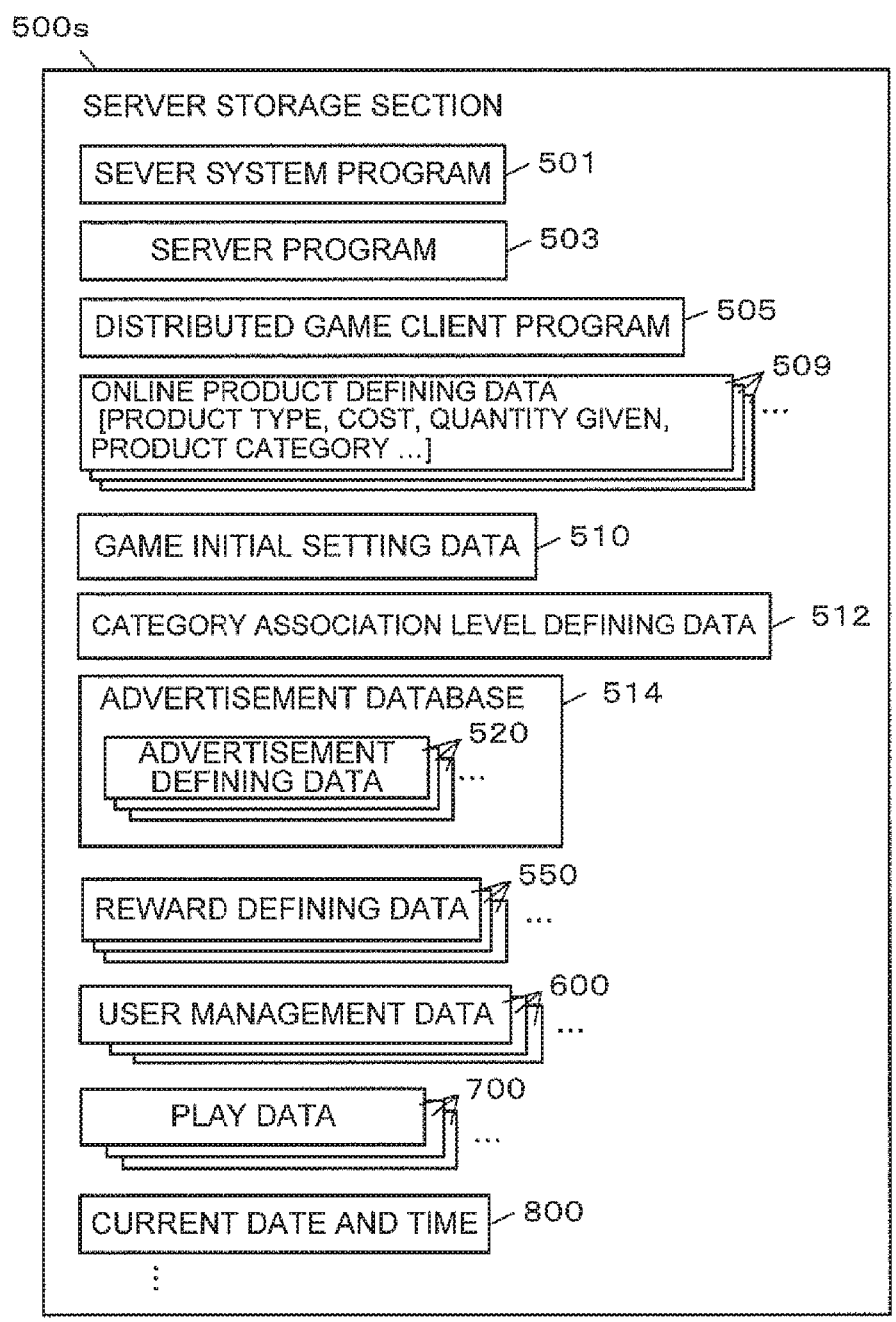

[FIG.12]

| CATEGORY ASSOCIATION LEVEL DEFINING DATA 512 | | | | | | | |
|---|---|---|---|---|---|---|---|
| 512a | 512b ADVERTISEMENT CATEGORY | | | | | | |
| PRODUCT CATEGORY | AD FOR WEAPON ITEM | AD FOR PROTECTION ITEM | AD FOR HEALING ITEM | ... | AD FOR BEVERAGE | AD FOR EVENT | AD FOR OTHER GAME |
| WEAPON | HIGH | MID | MID | ... | HIGH | MID | LOW |
| PROTECTION | MID | HIGH | MID | ... | MID | LOW | MID |
| ... | ... | ... | ... | ... | ... | ... | ... |

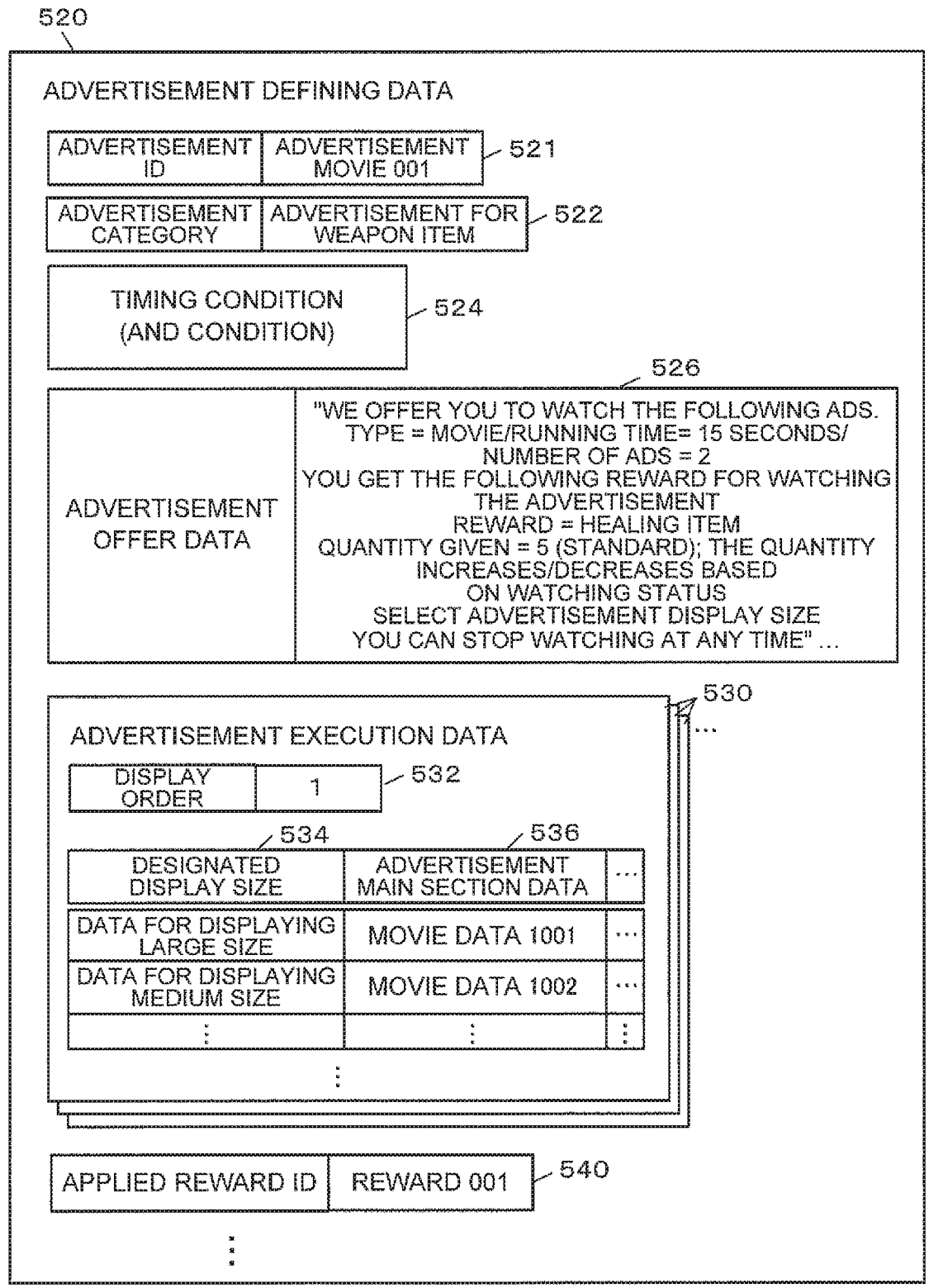
[FIG.13]

TIMING CONDITION (AND CONDITION)

| OFFER STATUS CONDITION | SETTING DETAILS |
|---|---|
| PLAY STATUS CONDITION | BEFORE GAME PLAY/DURING GAME PLAY /AFTER GAME PLAY/NOT SET |
| PLAY TIME CONDITION | TARGET TIME ZONE (EX. 24:00-26:00)/NOT SET |
| PLAY DATE CONDITION | TARGET DATE RANGE (EX. 2016/9/15-2016/9/17)/NOT SET |
| PLAY DAY OF THE WEEK CONDITION | TARGET DAY OF THE WEEK LIST (EX. Sat, Sun)/NOT SET |
| CURRENT PLAY TIME CONDITION | TARGET TIME RANGE (EX. 1HOUR TO 1 AND 1/2 HOURS)/NOT SET |
| GAME PROGRESS CHANGE CONDITION | TARGET CHANGE STATUS (EX. PLAYER WIN, PLAYER LOSE, LEVEL UP, ...)/NOT SET |
| ITEM CONSUMPTION CONDITION | TARGET ITEM + CONSUMED AMOUNT /NOT SET |
| INSTRUCTION OPERATION UNACCEPTABLE SITUATION CONDITION | TARGET SITUATION IDENTIFICATION TYPE LIST/NOT SET (EX. DATA LOADING, BATTLE START /BATTLE END NOTIFICATION SCREEN, MENU SWITCHING, SCREEN SWITCHING, ...) |
| GAME PROGRESS UNIT CONDITION | TARGET PROGRESS UNIT + DESIGNATION OF START OR END/NOT SET (EX. STAGE CHANGE, MAP CHANGE, REACHING SCENARIO TURNING POINT, REACHING PREDETERMINED POSITION IN GAME WORLD, ACQUIRING KEY ITEM, DEFEATING KEY CHARACTER, ...) |
| ⋮ | ⋮ |

| PLAYER CONDITION | SETTING DETAILS |
|---|---|
| CHARACTER TYPE CONDITION | TARGET CHARACTER TYPE LIST/NOT SET |
| PLAYER SKILL CONDITION | CHARACTER LEVEL RANGE/NOT SET |
| PLAYER GENDER CONDITION | TARGET GENDER LIST (EX. FEMALE) /NOT SET |
| PLAYER AGE CONDITION | TARGET AGE RANGE (EX. ~18)/NOT SET |
| PROGRESS CONDITION | GAME PROGRESS UNIT LIST (EX. STAGE1,2) /NOT SET |
| POSSESSED ITEM CONDITION | TARGET ITEM ID LIST (EX. KEY TO BOOKSTACK)/NOT SET |
| REGISTERED FRIEND CONDITION | TARGET REGISTERED QUANTITY LIST (EX. 3 OR MORE)/NOT SET |
| ⋮ | ⋮ |

| TIMING CONDITION (AND CONDITION) | |
|---|---|
| CHARGE HISTORY CONDITION | SETTING DETAILS |
| TOTAL CHARGE AMOUNT CONDITION | TOTAL CHARGE AMOUNT RANGE (EX. ~1000YEN)/NOT SET |
| TOTAL NUMBER OF CHARGED TIMES CONDITION | NUMBER OF TIMES RANGE (EX. 5 TIMES OR MORE)/NOT SET |
| CURRENT MONTH CHARGE AMOUNT CONDITION | TOTAL CHARGE AMOUNT RANGE (EX. ~1000YEN)/NOT SET |
| CURRENT MONTH NUMBER OF CHARGED TIMES CONDITION | NUMBER OF TIMES RANGE (EX. 5 TIMES OR MORE)/NOT SET |
| CHARGE FREQUENCY CONDITION | FREQUENCY RANGE (EX. ONCE PER PLAY OR MORE)/NOT SET |
| FREQUENTLY PURCHASED CATEGORY CONDITION | CATEGORY TYPE LIST (EX. PROTECTION)/NOT SET |
| ⋮ | ⋮ |

| REWARD HISTORY CONDITION | SETTING DETAILS |
|---|---|
| NUMBER OF REWARD ACQUIRED TIMES CONDITION | NUMBER OF TIMES RANGE (EX. LESS THAN 10 TIMES)/NOT SET |
| NUMBER OF SAME REWARD ACQUIRED TIMES CONDITION | REWARD ID + NUMBER OF TIMES RANGE (EX. 5 TIMES OR MORE)/NOT SET |
| ⋮ | ⋮ |

| PLAY HISTORY CONDITION | SETTING DETAILS |
|---|---|
| TOTAL PLAY TIME CONDITION | TIME RANGE (EX. ONLY WHEN PLAYED FOR 100 HOURS FOR THE FIRST TIME)/NOT SET |
| TOTAL NUMBER OF PLAY TIMES CONDITION | NUMBER OF TIMES RANGE (EX. ONLY WHEN PLAYED 10 TIMES FOR THE FIRST TIME)/NOT SET |
| PLAY FREQUENCY CONDITION | FREQUENCY RANGE (EX. 3 TIMES OR MORE PER WEEK)/NOT SET |
| ⋮ | ⋮ |

| ADVERTISEMENT WATCHING HISTORY CONDITION | SETTING DETAILS |
|---|---|
| TOTAL NUMBER OF WATCHED TIMES CONDITION | CATEGORY + NUMBER OF TIMES RANGE (EX. WEAPON + LESS THAN 10 TIMES)/NOT SET |
| TOTAL WATCHING TIME CONDITION | CATEGORY + TIME RANGE (EX. BEVERAGE + LESS THAN 1 HOUR)/NOT SET |
| FREQUENTLY WATCHED CATEGORY CONDITION | CATEGORY TYPE LIST (EX. EVENT ADVERTISEMENT)/NOT SET |
| ⋮ | ⋮ |

⋮

[FIG.16]
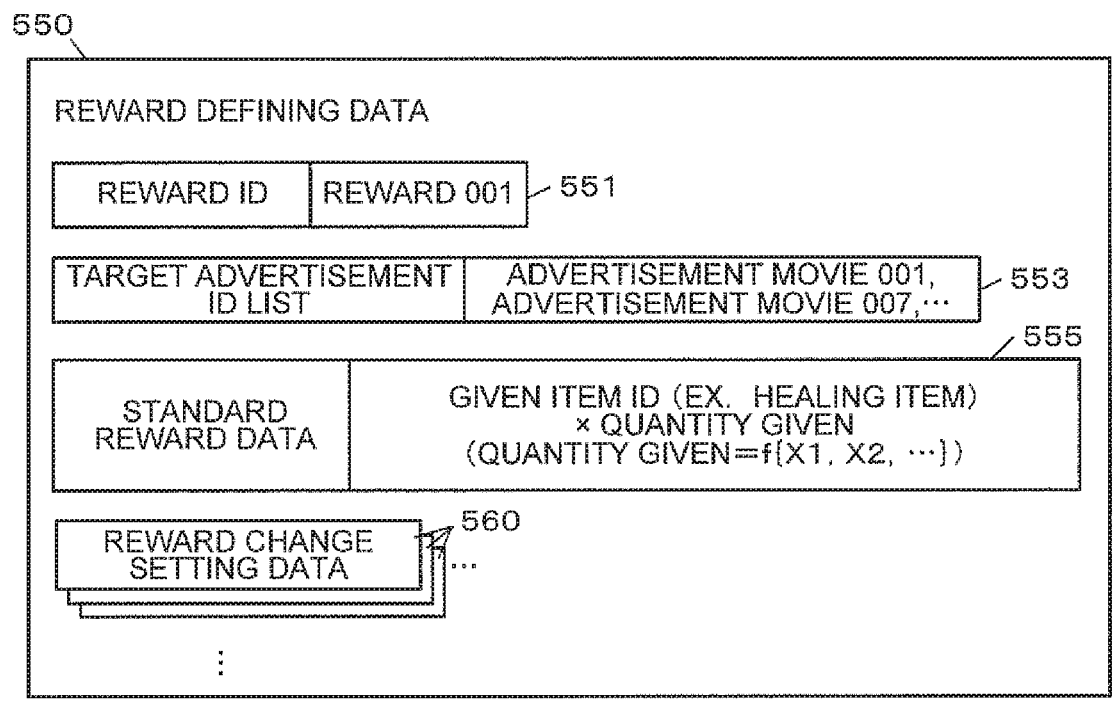

[FIG.17]

[CHANGE SETTING BASED ON OFFER CONDITION]

| REWARD CHANGE SETTING DATA 560 | CHANGE EXECUTING CONDITION 561 | CHANGED CONTENT 563 | REWARD GIVING NOTIFICATION SETTING DATA 565 |
|---|---|---|---|
| | OFFER TIMING= BEFORE GAME PLAY | QUANTITY GIVEN+1 | "ADDED REWARD FOR GOOD LUCK",... |
| | OFFER TIMING= DURING GAME PLAY> LEVEL UP | QUANTITY GIVEN+3 | "ADDED REWARD TO CELEBRATE LEVEL UP",... |
| | ... | ... | ... |
| | PLAY DAY OF THE WEEK=SUNDAY·HOLIDAYS ∩PLAY TIME=4:00–7:00 | ADDITIONAL ITEM ID | "ADDED REWARD AS THANKS FOR PLAYING EARLY DURING YOUR DAY OFF",... |
| | PLAY DATE=FEBRUARY 14TH ∩ PLAYER GENDER=MALE | ADDITIONAL ITEM ID (EX. THUNDER CHOCOLATE) | "ADDED REWARD. HAPPY VALENTINES DAY",... |
| | PLAYER WINS | ACQUIRED EXP×1.2 | "ADDED REWARD. CONGRATULATIONS",... |
| | PLAYER LOSES | REMATCH TICKET×1 | "ADDED REMATCH TICKET",... |
| | HIT POINT =LESS THAN 20% | FULL HEALING ITEM×1 | "THAT WAS A CLOSE ONE. THIS MIGHT HELP YOU",... |
| | WEAPON ITEM DESTROYED | 120% ATTACKING POWER UNTIL THE BATTLE ENDS | "THAT WAS A CLOSE ONE. THIS MIGHT HELP YOU",... |
| | ... | ... | ... |

[FIG. 18]

[CHANGE SETTING BASED ON CHARGE HISTORY]

560 REWARD CHANGE SETTING DATA

| CHANGE EXECUTING CONDITION (561) | CHANGED CONTENT (563) | REWARD GIVING NOTIFICATION SETTING DATA (565) |
|---|---|---|
| TOTAL CHARGE AMOUNT ≦1000 YEN (ONLY FOR THE FIRST TIME) | ADDITIONAL GIVEN ITEM ID (EX. HEALING ITEM×1) | "YOUR TOTAL ONLINE PURCHASE AMOUNT HAS REACHED 1000 YEN. HERE IS YOUR REWARD", ... |
| TOTAL CHARGE AMOUNT ≦5000 YEN (ONLY FOR THE FIRST TIME) | ADDITIONAL GIVEN ITEM ID (EX. HEALING ITEM×1) | "YOUR TOTAL ONLINE PURCHASE AMOUNT HAS REACHED 5000 YEN. HERE IS YOUR REWARD", ... |
| ... | ... | ... |
| CURRENT MONTH CHARGE AMOUNT =10000 YEN (ONLY FOR THE FIRST TIME) | ADDITIONAL GIVEN ITEM ID (EX. HEALING ITEM×1) | "YOUR TOTAL CURRENT MONTH ONLINE PURCHASE AMOUNT HAS REACHED 10000 YEN. HERE IS YOUR REWARD", ... |
| TOTAL NUMBER OF CHARGED TIMES=REACHED 100 TIMES (ONLY FOR THE FIRST TIME) | ADDITIONAL GIVEN ITEM ID (EX. ANTIDOTE ITEM×2) | "YOUR TOTAL ONLINE PURCHASING TIMES HAS REACHED 100 TIMES. HERE IS YOUR REWARD", ... |
| CURRENT MONTH NUMBER OF CHARGED TIMES=REACHED 10 TIMES (ONLY FOR THE FIRST TIME) | ADDITIONAL GIVEN ITEM ID (EX. ANTIDOTE ITEM×2) | "YOUR TOTAL CURRENT MONTH ONLINE PURCHASED TIMES HAS REACHED 10 TIMES. HERE IS YOUR REWARD", ... |
| CURRENT MONTH CHARGE FREQUENCY=REACHED ONCE A DAY (ONLY FOR THE FIRST TIME) | ADDITIONAL GIVEN ITEM ID (EX. ANTIDOTE ITEM×2) | "YOUR TOTAL CURRENT MONTH ONLINE PURCHASING FREQUENCY HAS REACHED ONCE PER DAY. HERE IS YOUR REWARD", ... |
| ADVERTISEMENT HIGHLY ASSOCIATED WITH TOP THREE CATEGORIES IN CHARGE CATEGORIES | QUANTITY GIVEN+1 | "ADDED REWARD" |
| ... | ... | ... |

[FIG.19]

[CHANGE SETTING BASED ON REWARD HISTORY]

560 — REWARD CHANGE SETTING DATA

| CHANGE EXECUTING CONDITION (561) | CHANGED CONTENT (563) | REWARD GIVING NOTIFICATION SETTING DATA (565) |
|---|---|---|
| NUMBER OF REWARD ACQUIRED TIMES<50 | FREE ITEM LOTTERY TICKET +1 | |
| 50≦NUMBER OF REWARD ACQUIRED TIMES<100 | QUANTITY GIVEN -1 | |
| ... | ... | ... |
| REWARD TYPE+ 5≦NUMBER OF SAME REWARD ACQUIRED TIMES<10 | QUANTITY GIVEN -3 ADDITIONAL ITEM ID | "REDUCED QUANTITY GIVEN AND ADDED DIFFERENT REWARD (YOU HAVE ALREADY RECEIVED A LOT OF SAME REWARDS)",... |
| REWARD TYPE+ 10≦NUMBER OF SAME REWARD ACQUIRED TIMES | CHANGED ITEM ID LIST | "CHANGED CONTENT OF REWARD (YOU HAVE ALREADY RECEIVED A LOT OF SAME REWARDS)",... |
| ... | ... | ... |

[FIG.20]

[CHANGE SETTING BASED ON PLAY HISTORY]

560 REWARD CHANGE SETTING DATA

| CHANGE EXECUTING CONDITION (561) | CHANGED CONTENT (563) | REWARD GIVING NOTIFICATION SETTING DATA (565) |
|---|---|---|
| TOTAL PLAY TIME=100 HOURS (ONLY FOR THE FIRST TIME) | ADDITIONALLY GIVEN ITEM ID (EX. PILLOW ITEM×1) | "YOUR TOTAL PLAY TIME HAS REACHED 100 HOURS. ADDED DIFFERENT ITEM AS THANKS." |
| TOTAL NUMBER OF PLAY TIMES=100 TIMES (ONLY FOR THE FIRST TIME) | ADDITIONALLY GIVEN ITEM ID (EX. ABILITY INCREASING ITEM×1) | "YOUR TOTAL NUMBER OF PLAYED TIMES HAS REACHED 100 TIMES. ADDED DIFFERENT ITEM AS THANKS." |
| OCCURRENCE OF PREDETERMINED EVENT (EVENT ID) | QUANTITY GIVEN −2 | "YOUR TOTAL NUMBER OF PLAYED TIMES HAS REACHED 100 TIMES. ADDED DIFFERENT ITEM AS THANKS." |
| ... | ... | ... |

[FIG.21]

[CHANGE SETTING BASED ON ADVERTISEMENT WATCHING HISTORY]

REWARD CHANGE SETTING DATA 560

| CHANGE EXECUTING CONDITION 561 | CHANGED CONTENT 563 | REWARD GIVING NOTIFICATION SETTING DATA 565 |
|---|---|---|
| 99 TIMES ≦ TOTAL NUMBER OF WATCHED TIMES (OR TOTAL WATCHING TIME) | ADDITIONALLY GIVEN ITEM ID (EX. BOMB ITEM×1) | "YOUR TOTAL NUMBER OF WATCHED TIMES HAS REACHED 100 TIMES. ADDED REWARD AS THANKS." |
| 19 TIMES ≦ NUMBER OF TIMES WATCHED IN CURRENT MONTH (OR WATCHING TIME IN CURRENT MONTH) | ADDITIONALLY GIVEN ITEM ID (EX. BOMB ITEM×2) | "YOUR NUMBER OF WATCHED TIMES IN CURRENT MONTH HAS REACHED 20 TIMES. ADDED REWARD AS THANKS." |
| ... | ... | ... |
| NUMBER OF TIMES SAME ADVERTISEMENT HAS BEEN WATCHED ≦ 5 TIMES | QUANTITY GIVEN +2 | "THANK YOU FOR WATCHING THE SAME ADVERTISEMENT AGAIN. ADDED REWARD AS THANKS." |
| 5 TIMES ≦ NUMBER OF TIMES SAME ADVERTISEMENT HAS BEEN WATCHED | QUANTITY GIVEN −2 | (−) |
| ... | ... | ... |

[FIG.22]

[CHANGE SETTING BASED ON ADVERTISEMENT DISPLAY STATUS]

REWARD CHANGE SETTING DATA 560

| CHANGE EXECUTING CONDITION 561 | CHANGED CONTENT 563 | REWARD GIVING NOTIFICATION SETTING DATA 565 |
|---|---|---|
| ADVERTISEMENT DISPLAY SIZE=LARGE | QUANTITY GIVEN +1 | "THANK YOU FOR WATCHING WITH A LARGE SIZE. ADDED ONE REWARD" |
| ADVERTISEMENT DISPLAY SIZE=SMALL | QUANTITY GIVEN -1 | "UNFORTUNATELY, YOUR SMALL SIZE WATCHING RESULTED IN ONE REWARD REDUCED" |
| ... | ... | ... |
| WATCHED AMOUNT=100% | QUANTITY GIVEN +5 | "THANK YOU FOR WATCHING THE ENTIRE AD. ADDED FIVE REWARDS" |
| 80%≦WATCHED AMOUNT<100% | QUANTITY GIVEN +3 | "THANK YOU FOR WATCHING MOST OF THE AD ..." |
| ADVERTISEMENT MOVIE | QUANTITY GIVEN +1 EACH TIME MOVIE IS PLAYED FOR 15 SECONDS | "THANK YOU FOR WATCHING THE MOVIE AD. ADDED REWARD." |
| WATCHING TIME | QUANTITY GIVEN +1 EACH TIME ADVERTISEMENT IS WATCHED FOR 60 SECONDS | "THANK YOU FOR WATCHING THE AD FOR A LONG PERIOD OF TIME. ADDED REWARD." |
| ... | ... | ... |

[FIG.23]
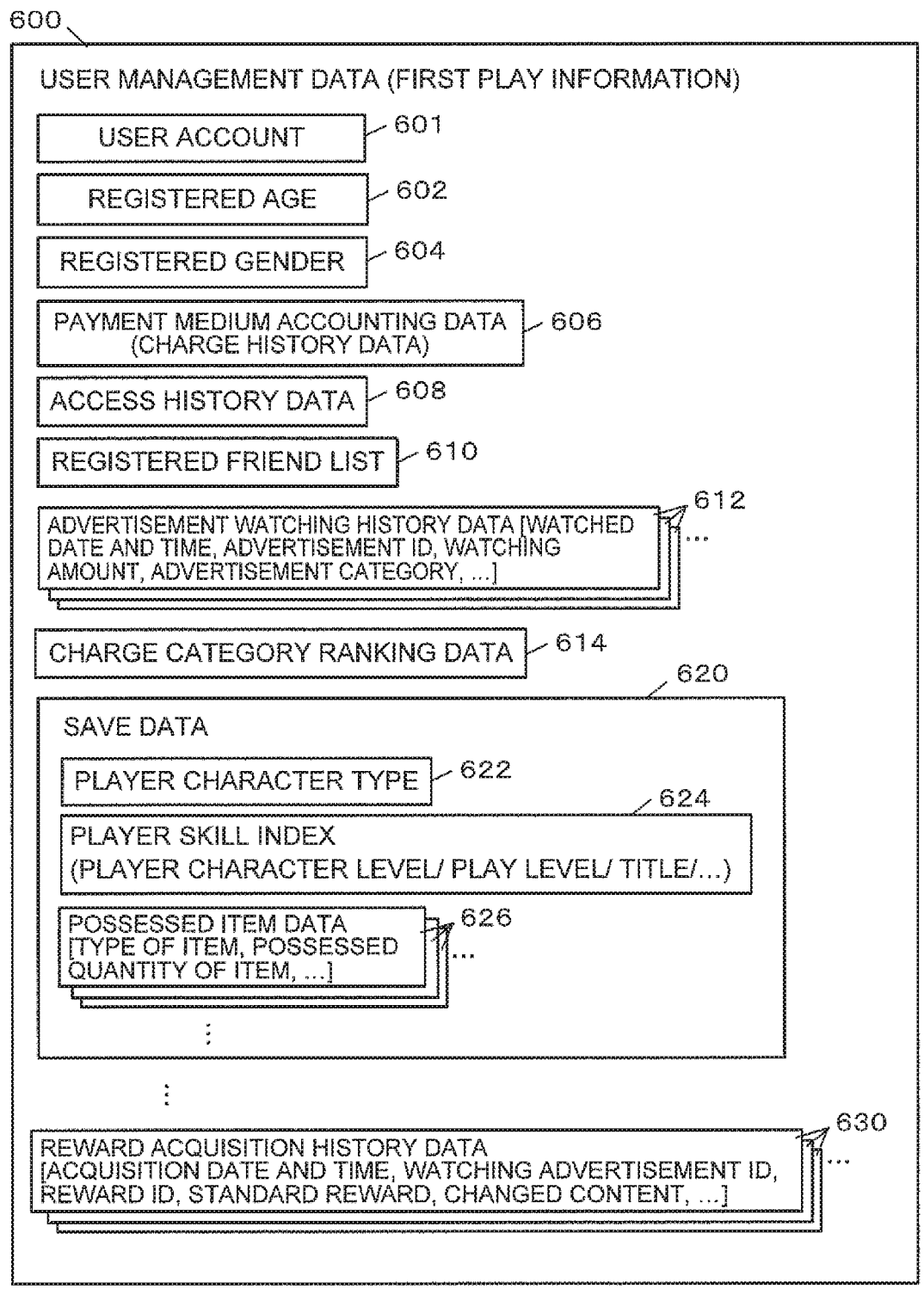

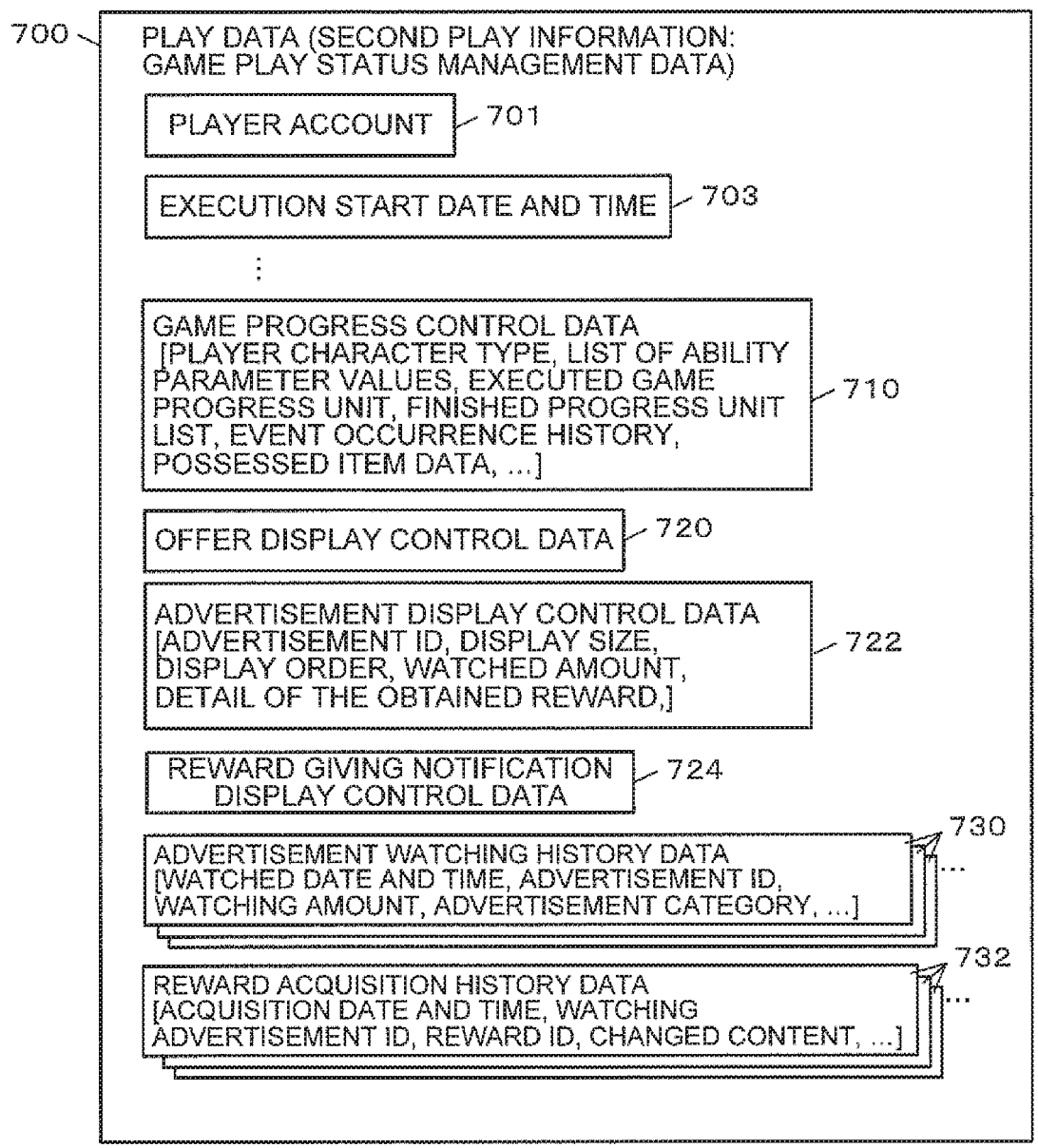
[FIG.24]

[FIG.25]
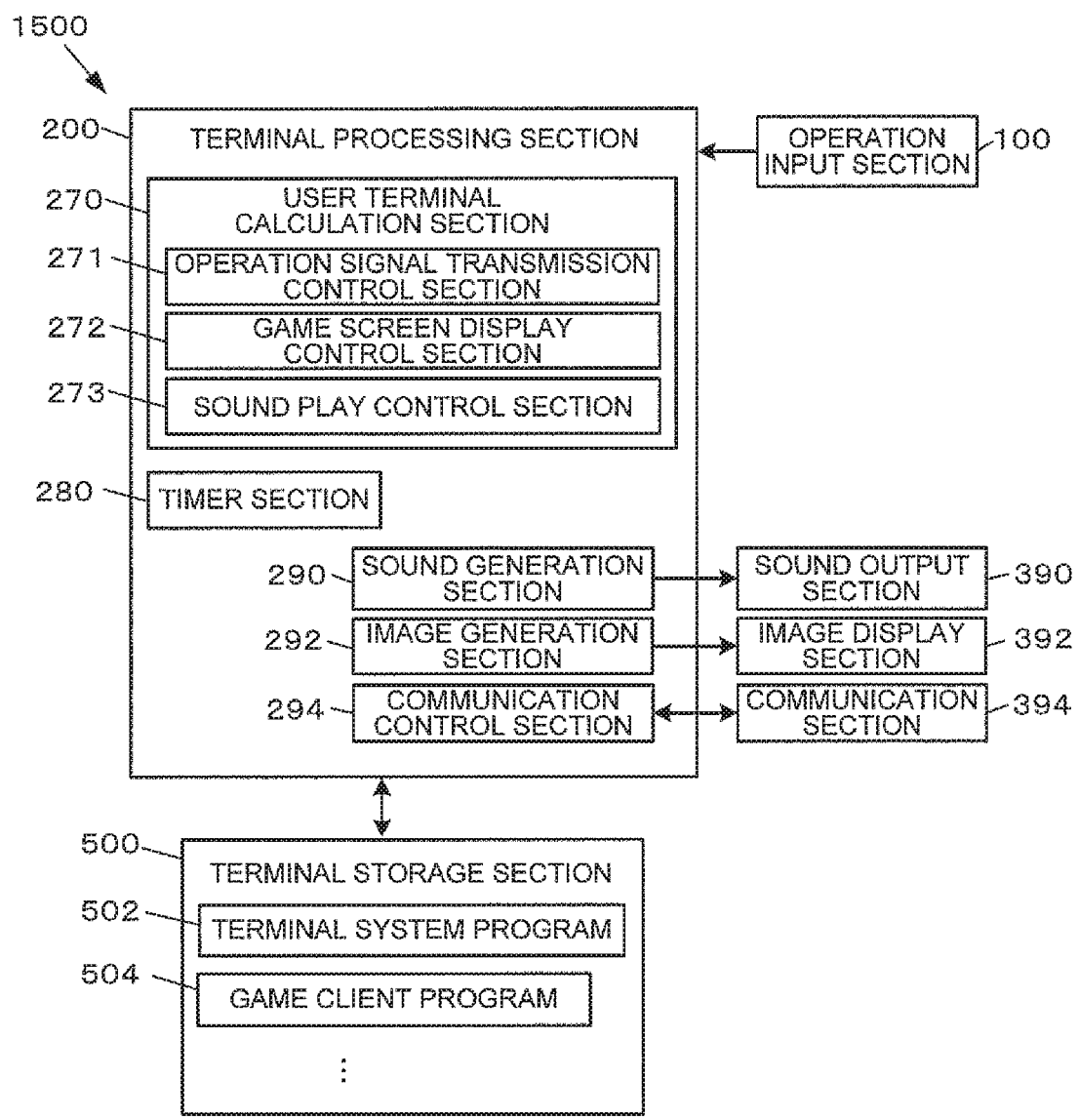

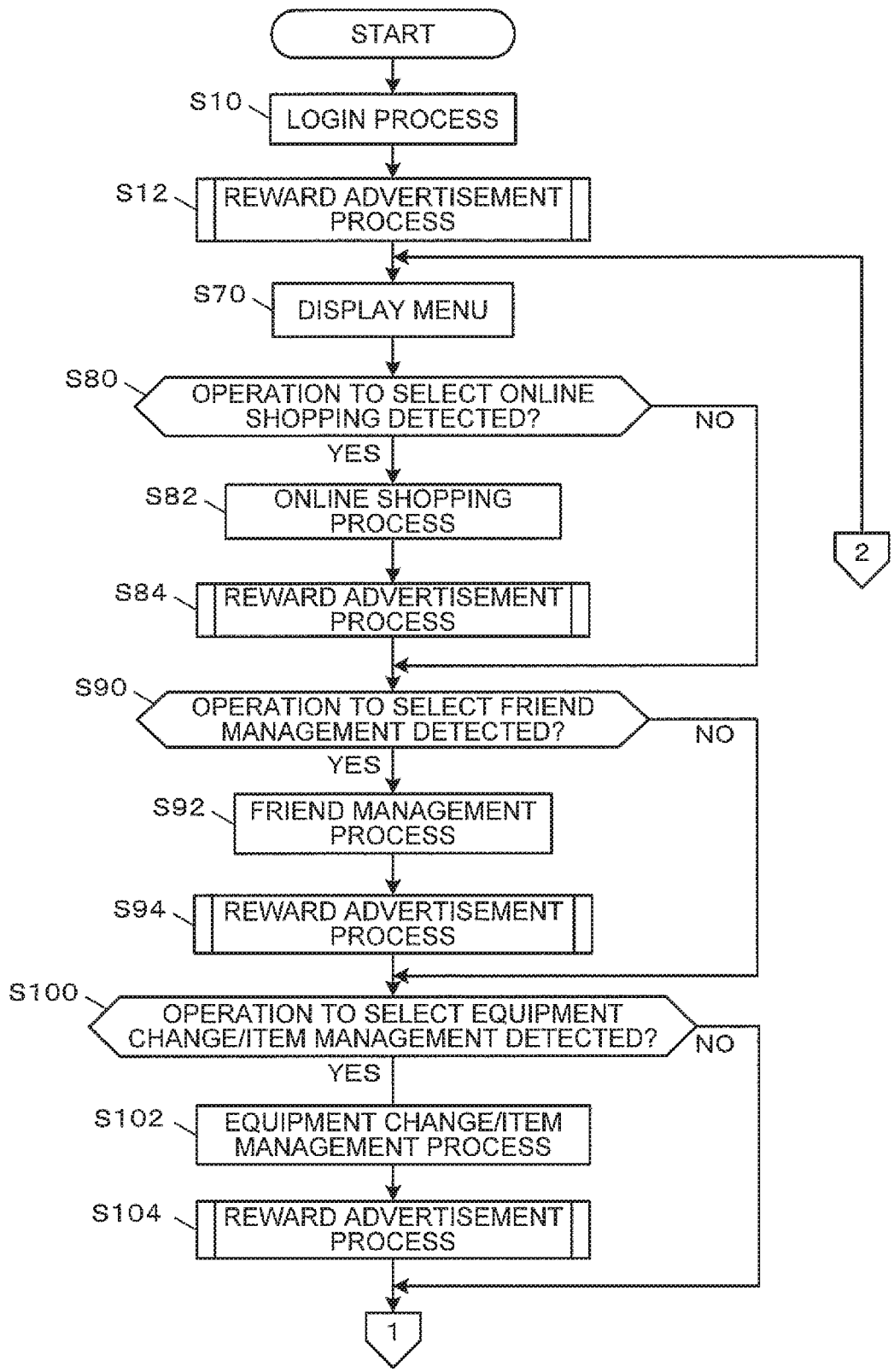

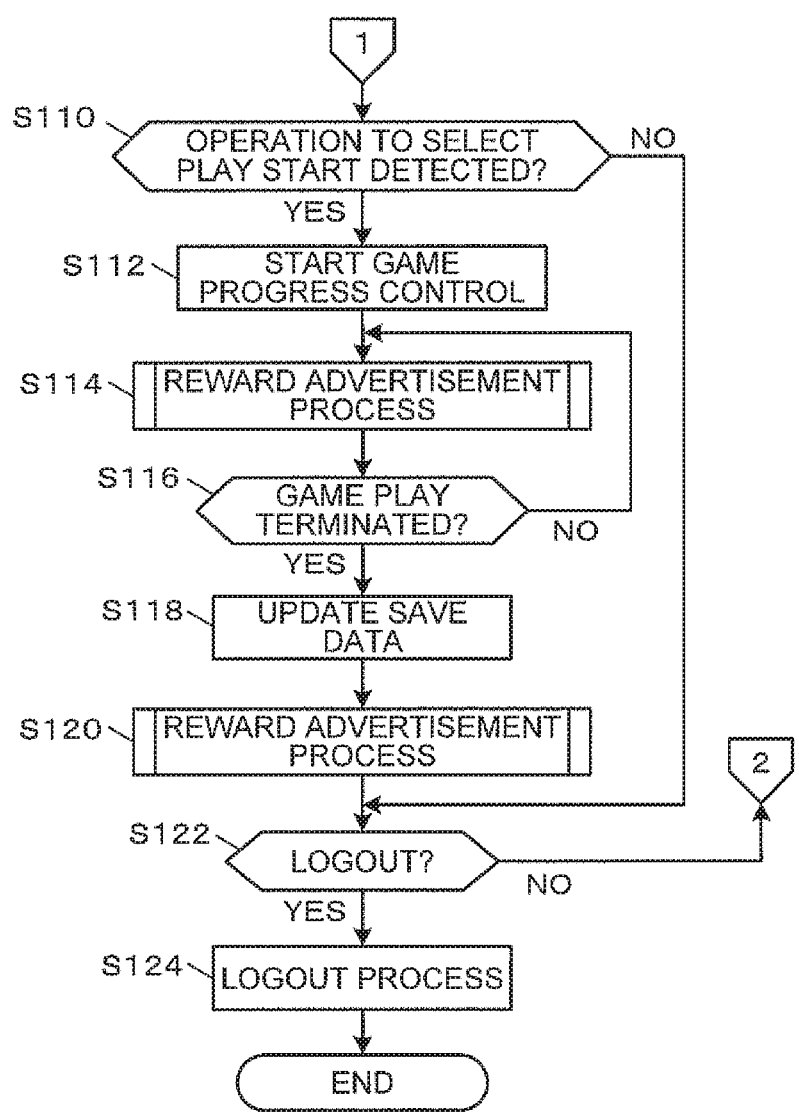
[FIG.27]

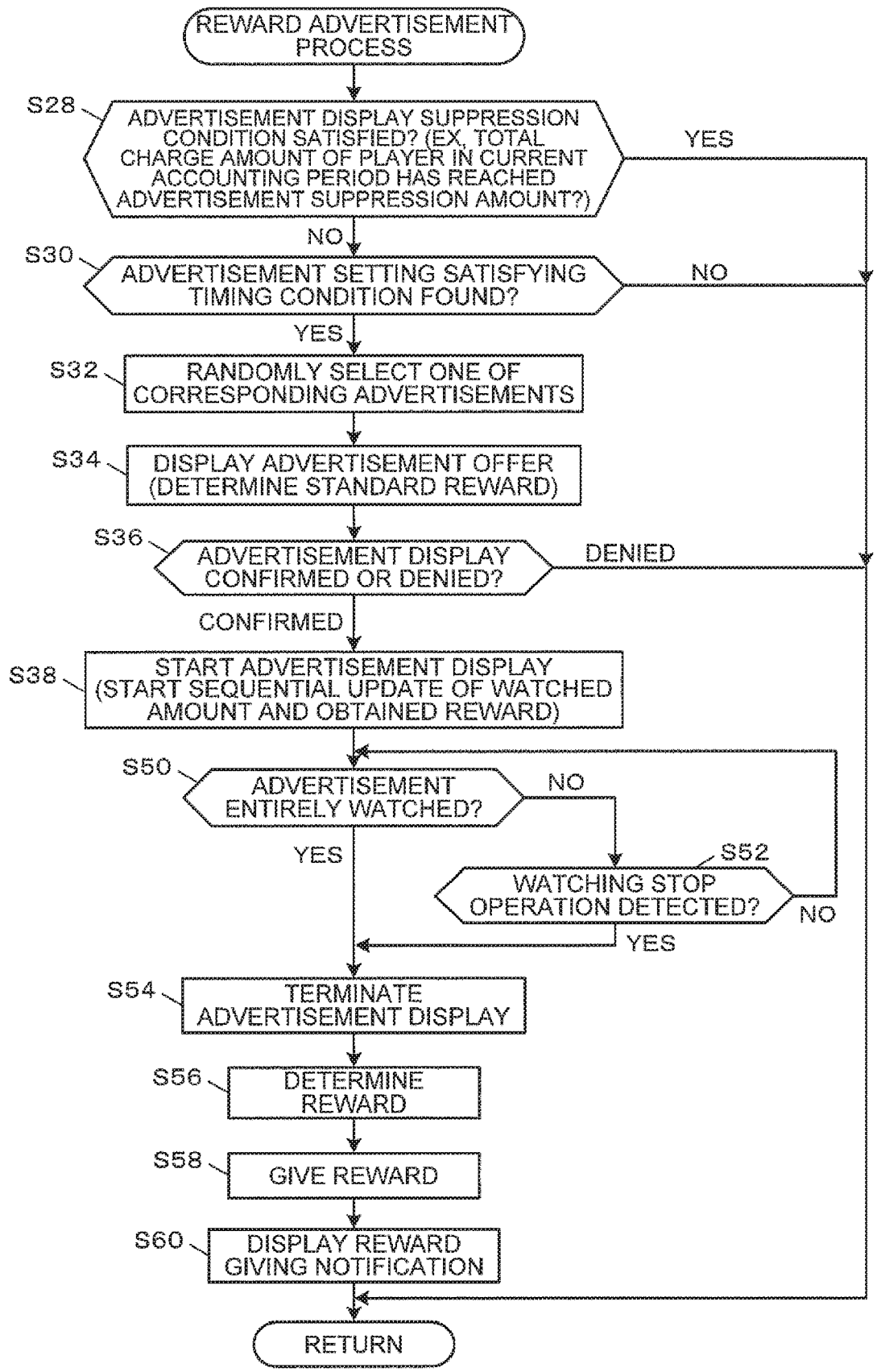

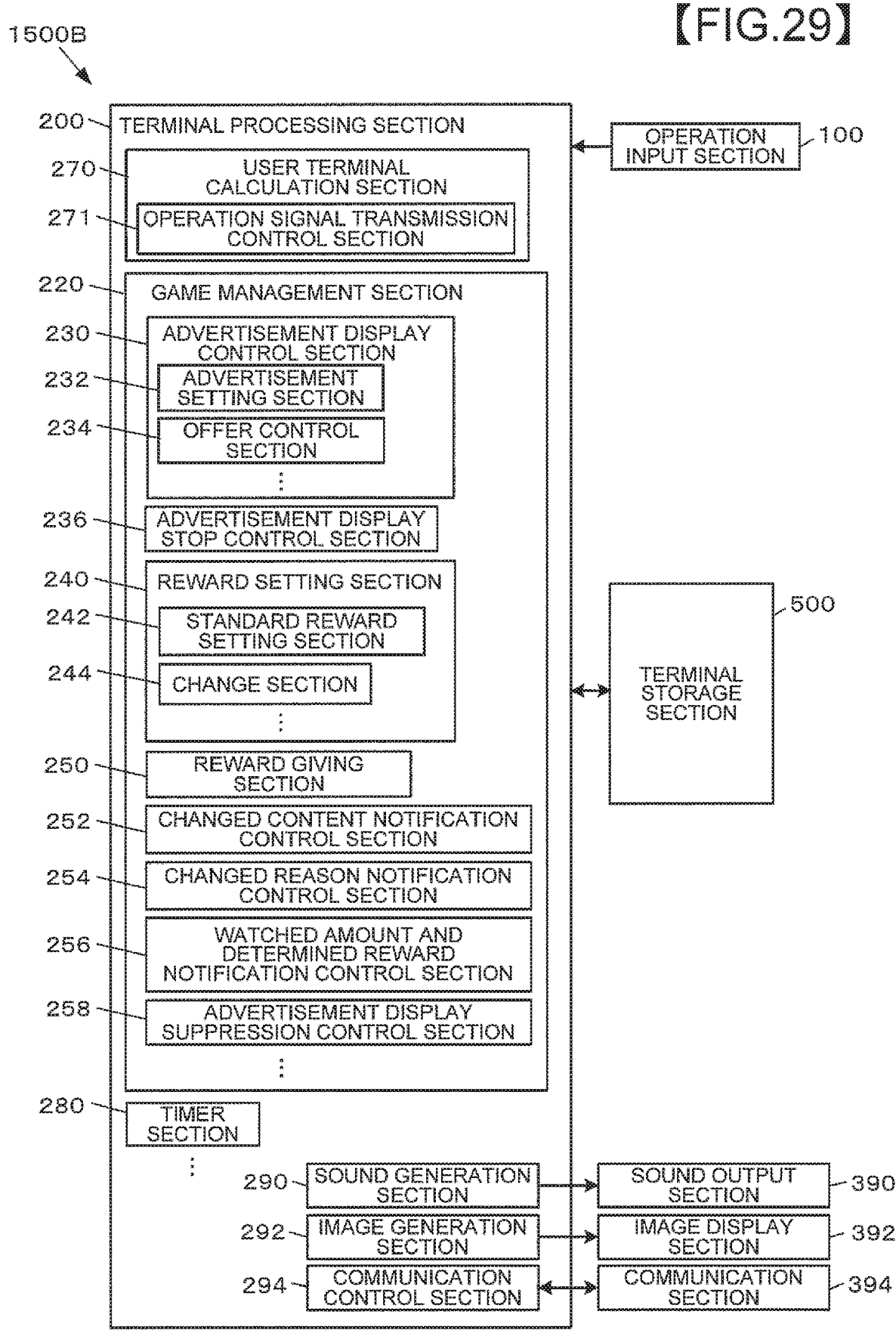
[FIG.29]

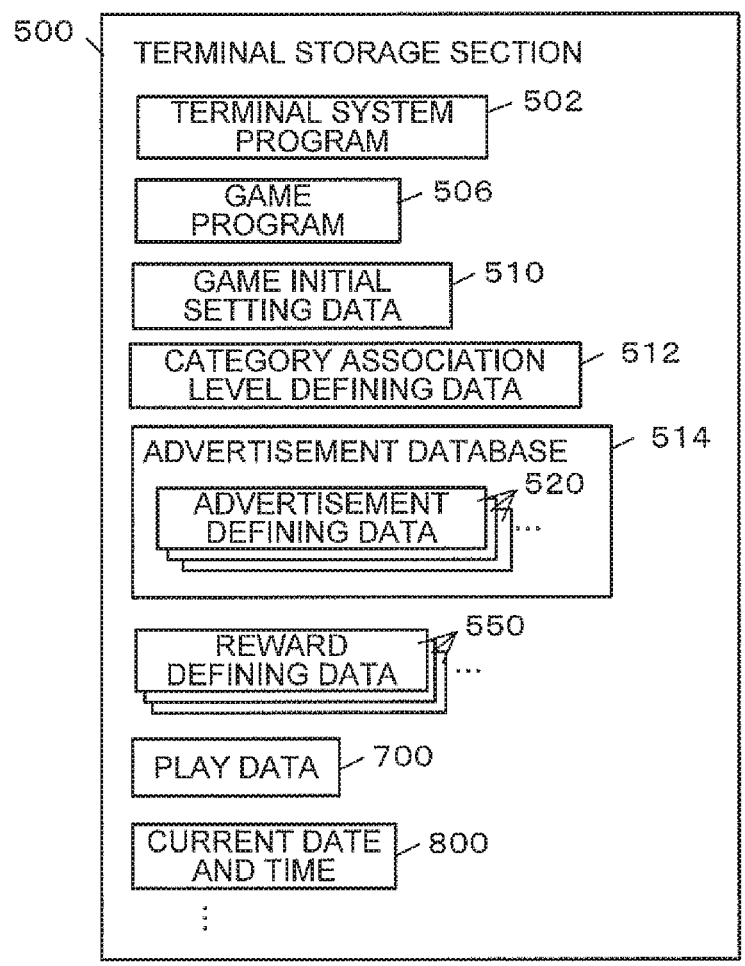

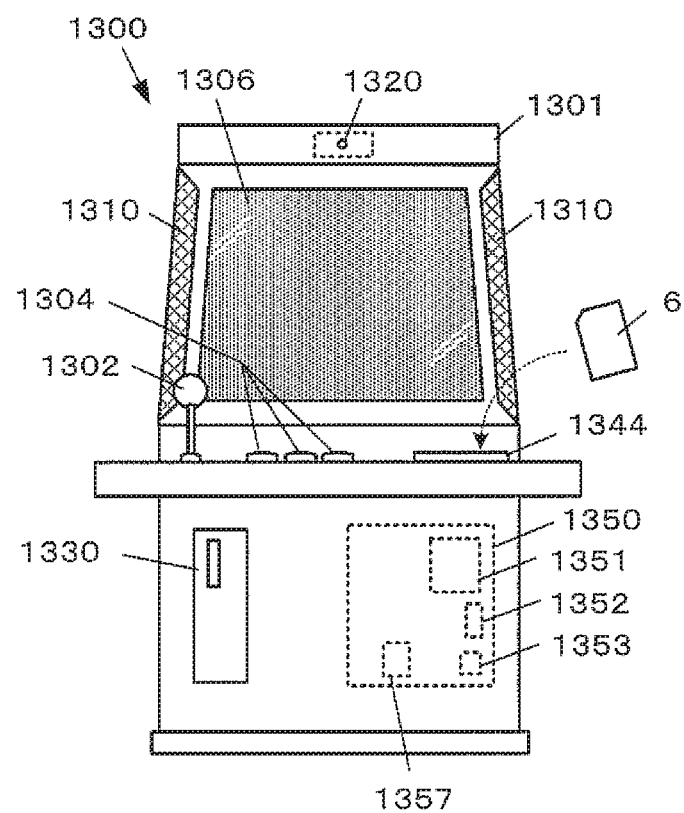
[FIG.31]

【FIG.32】
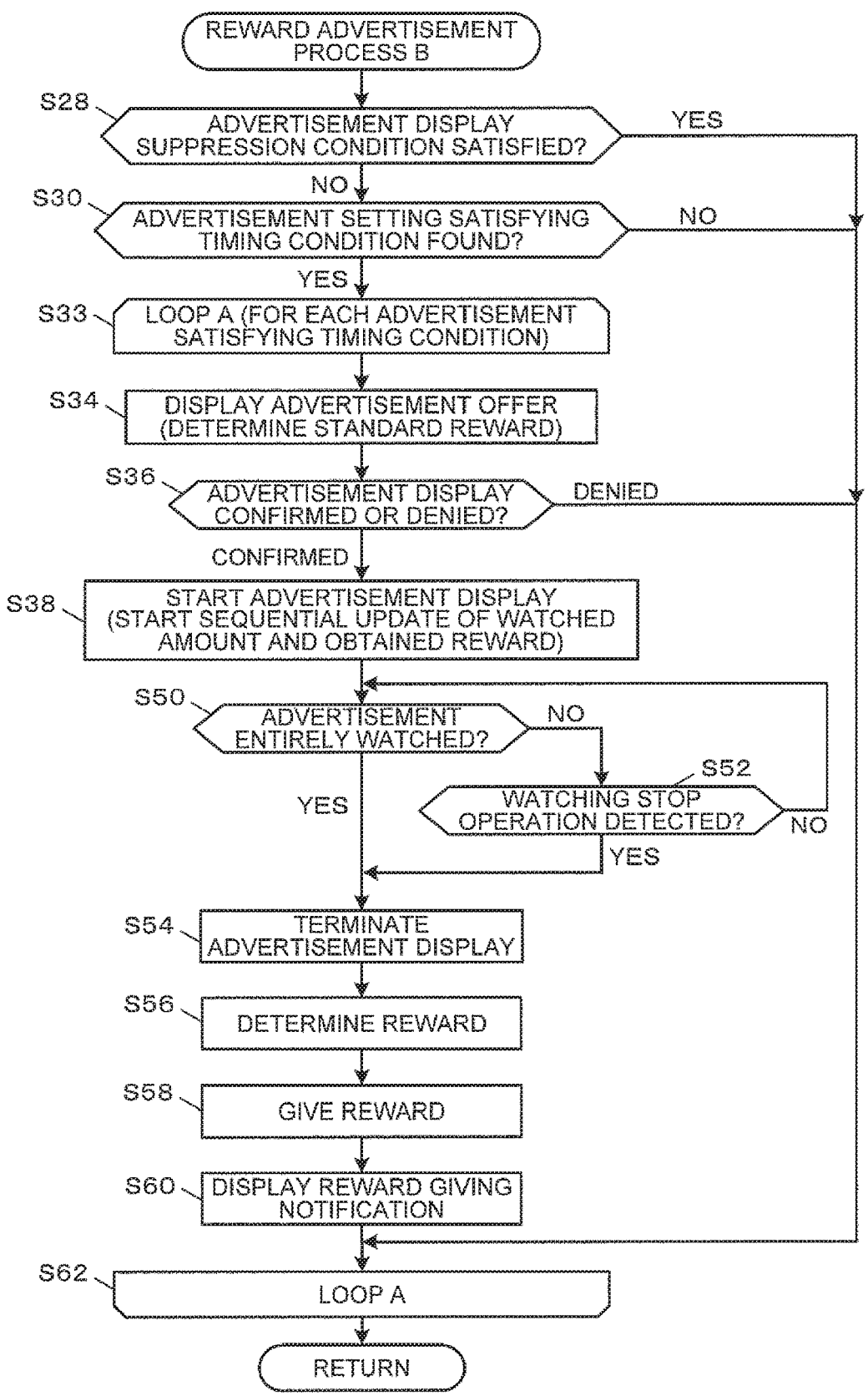

[FIG.33]
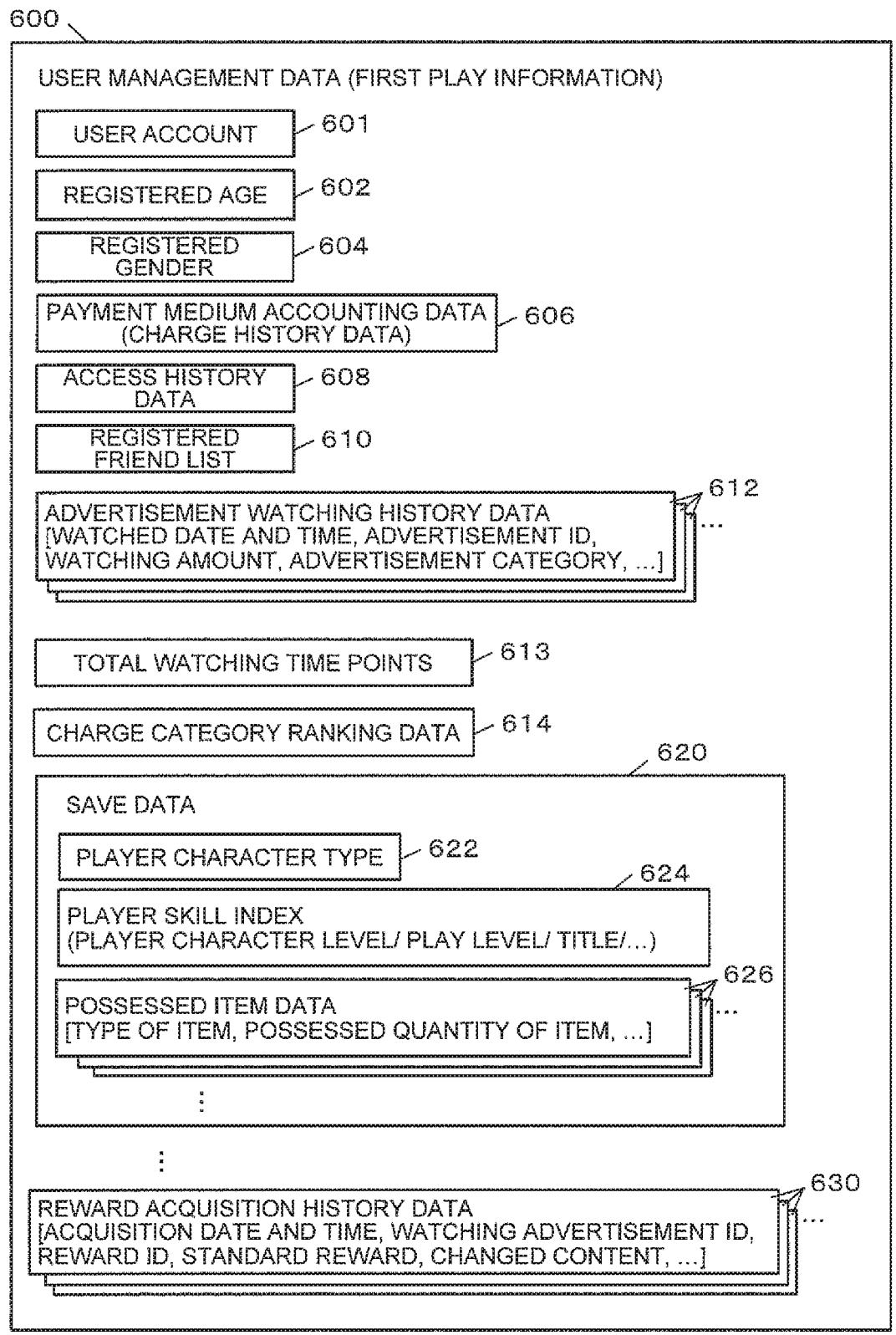

[FIG.34]
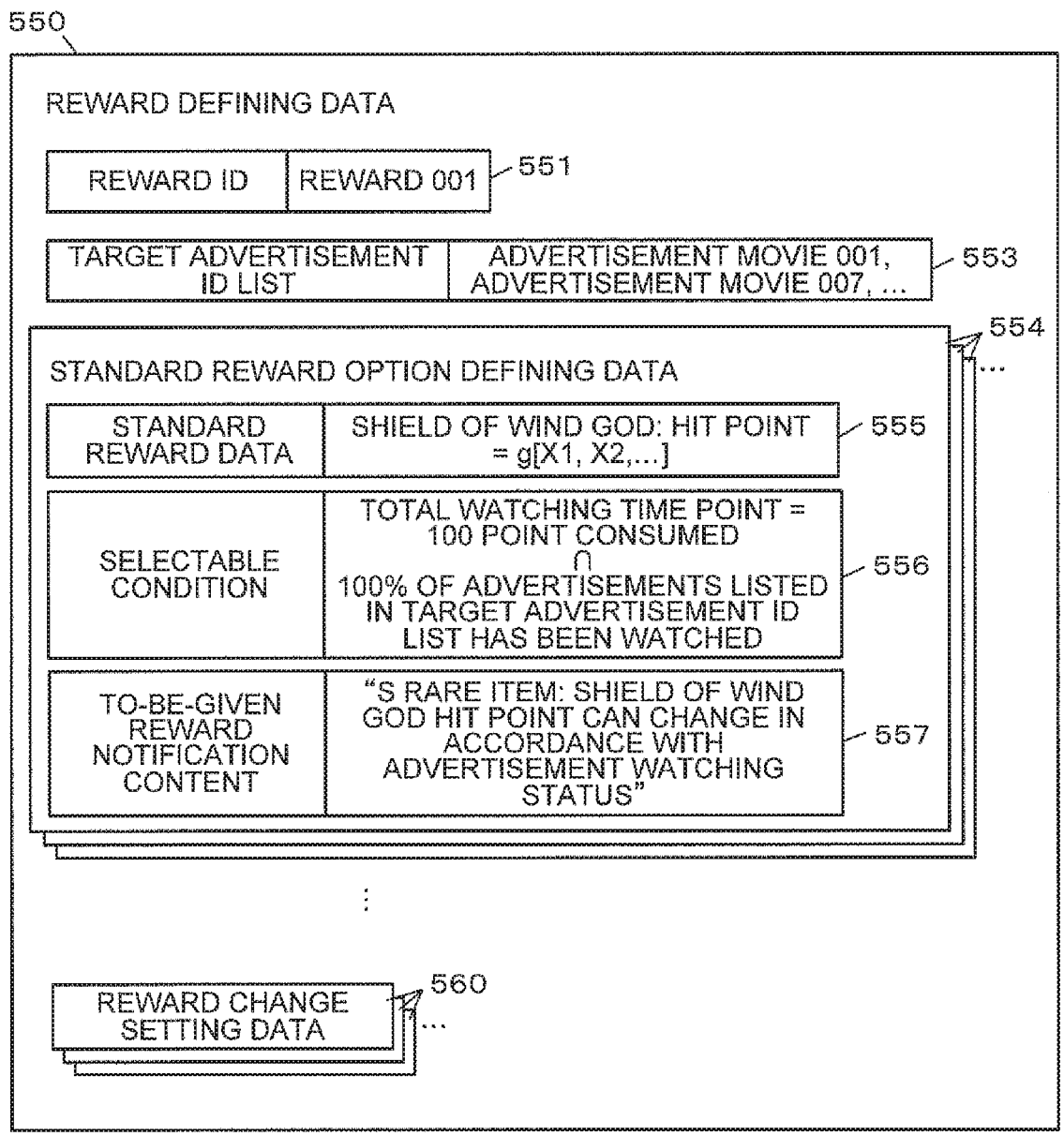

[FIG.35]
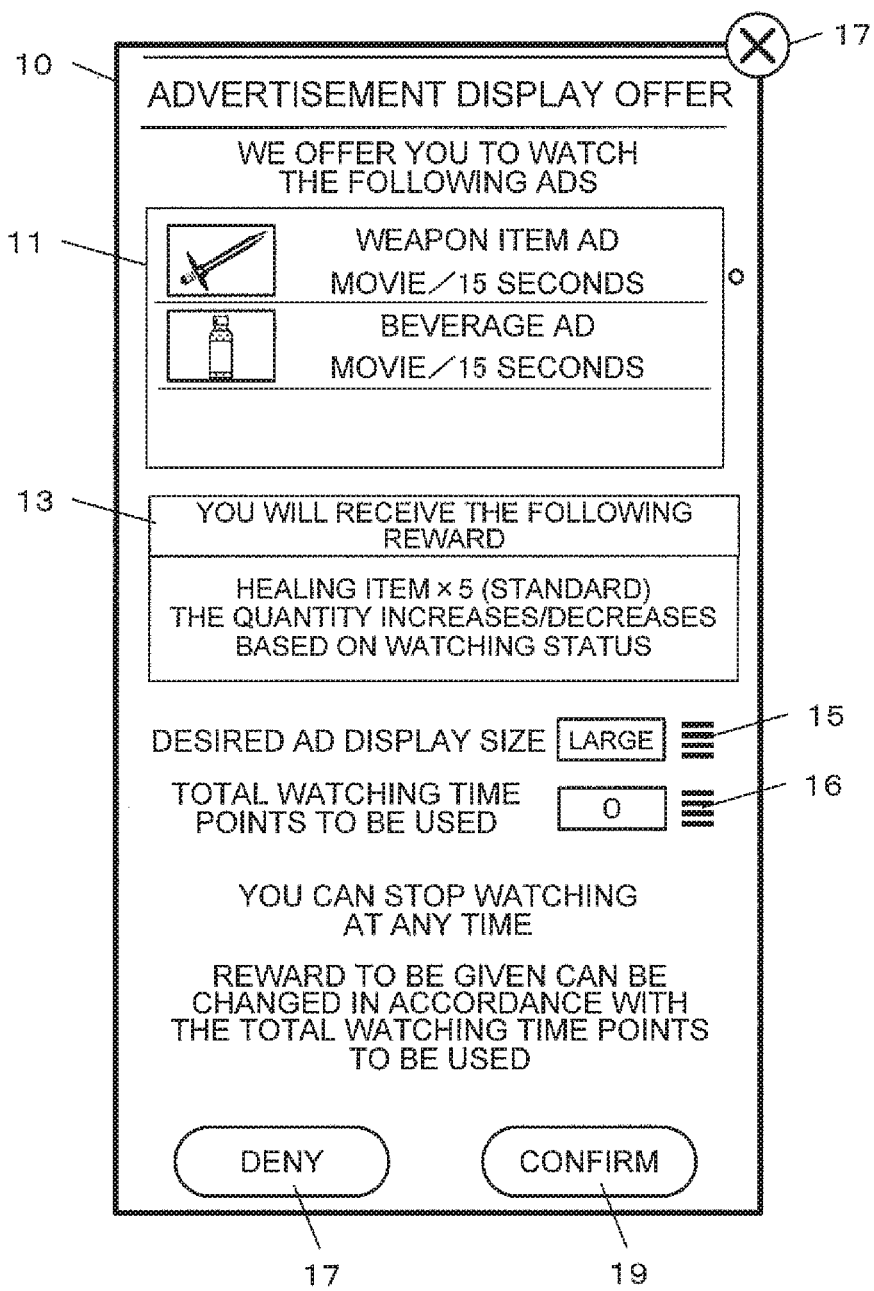

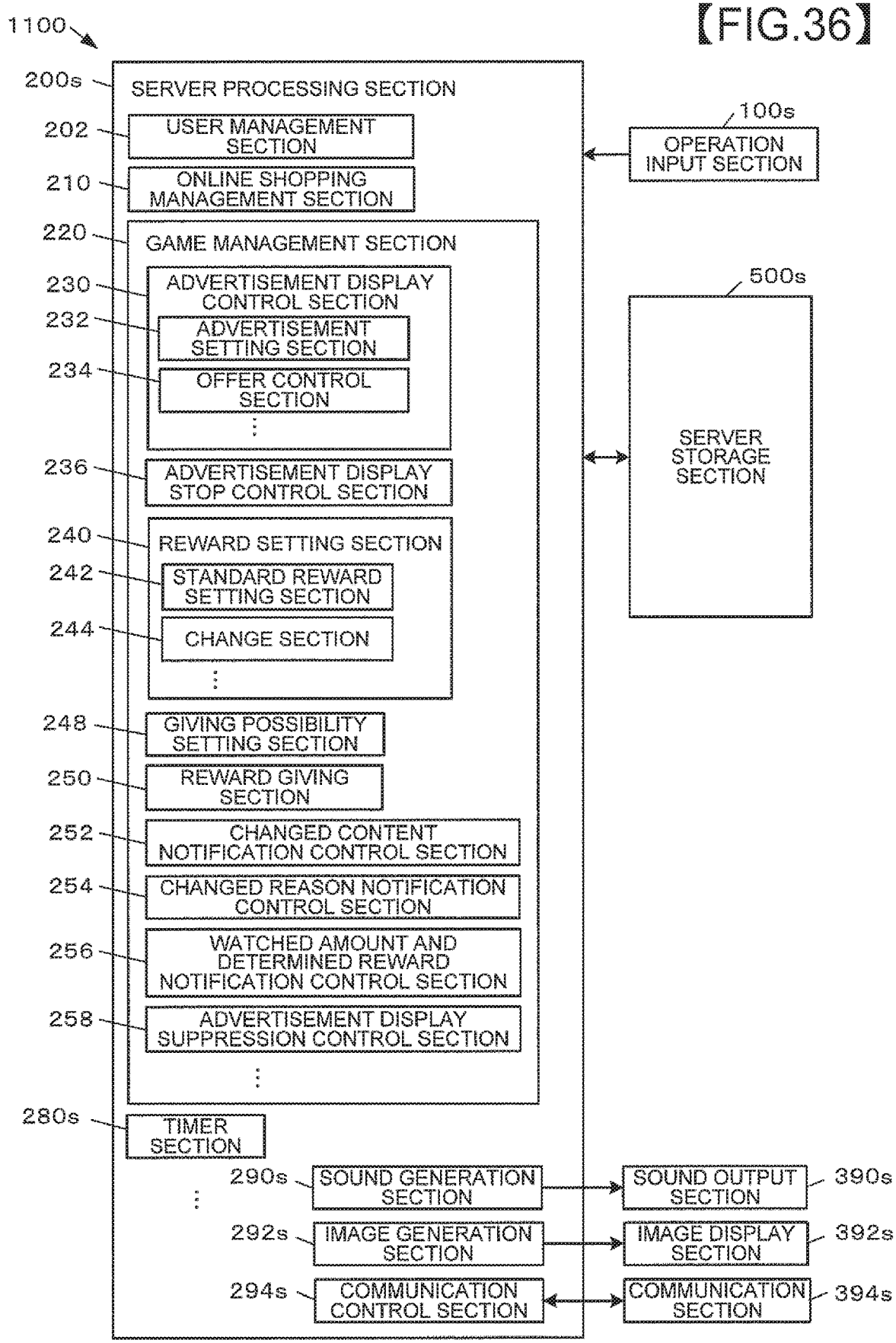
[FIG.36]

COMPUTER SYSTEM, GAME SYSTEM, AND GAME DEVICE

Japanese Patent Application No. 2016-239346 filed on Dec. 9, 2016, is hereby incorporated by reference in its entirety.

BACKGROUND

The present invention relates to a computer system and the like that performs control for displaying an advertisement in a game starting in response to a game play start operation by a player.

A "reward advertisement" has become a popular means for gaining profits in an online game. The reward advertisement is an advertisement that is displayed on an advertisement screen in a computer such as a user terminal, and features a reward given to a user who has watched the advertisement, accessed a website presented by the advertisement, or installed an application presented by the advertisement (see Japanese Translation of PCT International Application Publication No. JP-T-2003-529093 for example).

As described above, the reward advertisement is advantageous to a user who watches the advertisement or takes the other like actions. The content of the reward advertisement does not basically change within a determined advertising period. Thus, a user playing a game watches the same advertisement over and over again. The advertisement could be regarded as an entertainment when it is seen for the first time. However, watching the same advertisement over and over again is nothing more than a cumbersome obligation. Thus, the user is extremely less incentivized to watch the advertisement despite the reward, and might start skipping the advertisement to be watched or might even feel negative about the advertised product.

Conventionally, the reward advertisement has been displayed at a fixed timing or has been randomly selected to be displayed to constantly occupy a part of the game screen. Such conventional ways of displaying the advertisement might fail to fully gain the potential of the advertisement. For example, when an advertisement introducing a new item for increasing attack power of a player character is displayed in a strip-shaped display section (or a small window) during game play, the player gradually loses his or her attention to the display section, and thus the effect of the advertisement decreases accordingly.

SUMMARY

According to one aspect of the invention, there is provided a computer system comprising: at least one processor or circuit programmed to execute as:
  starting a game based on a game play start operation by a player;
  performing display control for a given advertisement in the game;
  setting a reward in the game for watching the advertisement based on a play information on the player related to the game; and
  giving the reward to the player.

BRIEF DESCRIPTION OF THE DRAWINGS

FIG. 1 is a diagram illustrating an example of a configuration of a game system.

FIG. 2 is a first diagram illustrating how a reward for watching an advertisement is set.

FIG. 3 is a diagram illustrating a display example of an offer display section.

FIG. 4 is a diagram illustrating a display example of an advertisement display.

FIG. 5 is a diagram illustrating a display example of a reward giving notification.

FIG. 6 is a second diagram illustrating how a reward for watching an advertisement is set.

FIG. 7 is a third diagram illustrating how a reward for watching an advertisement is set.

FIG. 8 is a fourth diagram illustrating how a reward for watching an advertisement is set.

FIG. 9 is a diagram illustrating how an advertisement to be displayed next is selected.

FIG. 10 is a functional block diagram illustrating an example of a functional configuration of a server system according to a first embodiment.

FIG. 11 is a diagram illustrating an example of a program and data stored in a server storage section according to the first embodiment.

FIG. 12 is a diagram illustrating an example of a data structure of category association level defining data.

FIG. 13 is a diagram illustrating an example of a data structure of advertisement defining data.

FIG. 14 is a diagram illustrating an example of a data structure of timing condition (part 1).

FIG. 15 is a diagram illustrating an example of the data structure of the timing condition (part 2).

FIG. 16 is a diagram illustrating an example of a data structure of reward defining data.

FIG. 17 is a diagram illustrating an example of a data structure of reward change setting data (part 1).

FIG. 18 is a diagram illustrating an example of the data structure of the reward change setting data (part 2).

FIG. 19 is a diagram illustrating an example of the data structure of the reward change setting data (part 3).

FIG. 20 is a diagram illustrating an example of the data structure of the reward change setting data (part 4).

FIG. 21 is a diagram illustrating an example of the data structure of the reward change setting data (part 5).

FIG. 22 is a diagram illustrating an example of the data structure of the reward change setting data (part 6).

FIG. 23 is a diagram illustrating an example of a data structure of user management data.

FIG. 24 is a diagram illustrating an example of a data structure of play data.

FIG. 25 is a functional block diagram illustrating an example of a functional configuration of a user terminal according to the first embodiment.

FIG. 26 is a flowchart illustrating a flow of a process in the server system according to the first embodiment.

FIG. 27 is a flowchart continuing from FIG. 26.

FIG. 28 is a flowchart illustrating a flow of a reward advertisement process.

FIG. 29 is a functional block diagram illustrating an example of a functional configuration of a user terminal according to a second embodiment.

FIG. 30 is a diagram illustrating an example of a program and data stored in a terminal storage section in the user terminal according to the second embodiment.

FIG. 31 is a diagram illustrating an example of a configuration of an arcade game device employing the present invention.

FIG. 32 is a flowchart illustrating a modification of a flow of the reward advertisement process.

FIG. 33 is a flowchart illustrating an example of a data structure of a modification of the user management data.

FIG. 34 is a flowchart illustrating an example of a data structure of a modification of the reward defining data.

FIG. 35 is a diagram illustrating a modification of the offer display section.

FIG. 36 is a functional block diagram illustrating a modification of the functional configuration of the server system.

DESCRIPTION OF EXEMPLARY EMBODIMENTS

The present embodiment can provide a new technique of incentivizing a user to watch a reward advertisement displayed in a game, and can further provide a technique of more effectively presenting a reward advertisement.

According to one embodiment of the invention, there is provided a computer system comprising: at least one processor or circuit programmed to execute as:

starting a game based on a game play start operation by a player;

performing display control for a given advertisement in the game;

setting a reward in the game for watching the advertisement based on a play information on the player related to the game; and giving the reward to the player.

The "computer system" as used herein may be a system including a single computer, and may be a system including a plurality of computers that are connected to each other to be capable of performing data communications with each other through a communication line.

According to this configuration, what is known as a "reward advertisement" that is watched in exchange for a reward can be displayed. The reward can be set based on user data and play data on a player related to the game. Thus, the content of the reward can be changed in accordance with information on the player related to the game. Thus, even when an advertisement that has already been seen is displayed, the player can expect that a different reward might be acquirable because the current status is different from the last time the advertisement was displayed. Thus, the player can be more incentivized to watch the reward advertisement.

In the computer system, the setting the reward may include:

setting a standard reward for watching the given advertisement; and setting the reward to be actually given by changing the standard reward.

According to this configuration, the reward to be actually given to the player can be set by changing the standard reward. For example, a reward may be added to the standard reward when the advertisement is entirely watched, or the standard reward may be reduced when the advertisement is only seen for less than ⅓ of its full length. Thus, the player can easily recognize how the reward has changed, and thus can be incentivized to entirely watch the advertisement.

The computer system may further comprise notifying the player of a content of the change.

According to this configuration, the player can be notified of how the content of the reward for watching the advertisement has changed, so as not to be disappointed by the content of the reward.

The computer system may further comprise notifying the player of a reason of the change.

According to this configuration, the player can be notified of why the content of the reward for watching the advertisement has changed, so as not to be disappointed by the content of the reward.

The computer system may further comprise performing control displaying of the given advertisement based on a watching stop operation performed by the player, before the given advertisement is entirely displayed, the setting the reward to be actually given includes setting the reward to be actually given in accordance with a watched amount of the given advertisement, after the display control for the given advertisement.

According to this configuration, the player can stop the displaying of the advertisement without entirely watching the advertisement, and a reward can be changed in accordance with how much the player has watched the advertisement.

The computer system may further comprise performing display control for a display indicating the current watched amount and a reward given when the watching stop operation is performed.

According to this configuration, the player can be aware of how much the advertisement has been watched relative to the entire amount of the advertisement, and what kind of reward he or she can acquire by stopping watching the advertisement at the current point. Thus, the player can determine whether or not to stop watching the advertisement based on these aspects.

The computer system may further comprise: presenting the standard reward to offer the player to watch the given advertisement; and starting the display control for the given advertisement when the player performs a confirmation operation for the offer.

According to this configuration, a display timing can be set for each advertisement. The advertisement is displayed only when an offer issued before the advertisement is displayed is confirmed. This ensures a higher chance (or possibility) of the advertisement being actually watched by the player.

In the computer system, the setting the standard reward may include setting the standard reward based on the play information on the player related to the game.

In the computer system, the setting the standard reward may include setting the standard reward to be predetermined reward associated with the given advertisement, the setting the reward to be actually given including setting the reward to be actually given by changing the standard reward based on the play information on the player related to the game.

According to this configuration, the standard reward can be changed in accordance with the play information on the player related to the game, whereby a variety of the rewards to be actually given can be increased. Thus, effect of incentivizing the player to watch the reward advertisement can be expected.

In the computer system, the play information may include data on a reward that has already been acquired by the player.

According to this configuration, a variety of the rewards to be actually given can be increased based on information on the reward that has been acquired by the player in the past. Thus, effect of incentivizing the player to watch the reward advertisement can be expected.

In the computer system, the play information may include data indicating a progress status of the game.

According to this configuration, the standard reward can be changed in accordance with the game progress status, whereby a variety of the rewards to be actually given can be increased. Thus, effect of incentivizing the player to watch the reward advertisement can be expected.

In the computer system, the play information may include play level of the player.

According to this configuration, the standard reward can be changed based on the play level indicating the skill of the player, whereby a variety of the rewards to be actually given can be increased. Thus, effect of incentivizing the player to watch the reward advertisement can be expected.

In the computer system, the play information may include charge information on the player.

According to this configuration, the standard reward can be changed based on the charge history of the player, whereby a variety of the rewards to be actually given can be increased.

According to another embodiment of the invention, there is provided a computer system comprising: at least one processor or circuit programmed to execute as:

starting a game based on a game play start operation by a player;

performing display control for a given advertisement in the game;

setting a reward in the game for watching the advertisement based on a play information on the player related to the game;

setting a chance of the reward being given to the player to be variable in accordance with watching time and/or number of watched times of the given advertisement; and performing control to give the reward to the player based on the set chance.

According to this configuration, the chance of the reward being given to the player can be set to be variable in accordance with the watching time and/or the number of watched times of the advertisement. Thus, a new technique for incentivizing the player to watch the reward advertisement can be provided.

According to another embodiment of the invention, there is provided a game system comprising: a server system that is the computer system and a user terminal to which the player inputs an operation, the server system and the user terminal being connected to the game system to be capable of performing a communication with each other.

According to this configuration, the game system connected with the server system and the user terminal to perform communications with each other can achieve the effects described above.

According to another embodiment of the invention, there is provided a game device comprising an operation input section to which the player inputs an operation, the game device being the computer system.

According to this configuration, the game device that can achieve the effects described above can be implemented.

An exemplary embodiment of the present invention is described below. It is a matter of course that modes to which the present invention can be applied are not limited to the embodiments described below.

First Embodiment

An example of display control for an advertisement that is watched in exchange for a reward given to a player in a game starting based on a game play start operation by the player is described as a first embodiment. The game may be of any genre, and may be a single player game or a multi-player game.

[Hardware Configuration]

First of all, an example of a hardware configuration according to the present embodiment is described.

FIG. 1 is a diagram illustrating an example of a configuration of a game system according to the present embodiment. A game system 1000 according to the present embodiment is a system including a server system 1100 and a user terminal 1500 that can be connected to a communication line 9 to communicate with each other to exchange data. The illustrated example includes a single user terminal 1500. However, in an actual operation, a plurality of user terminals 1500 of different users who play the game (hereinafter, referred to as "players") may each be connected to and communicate with the server system 1100. The game system 1000 as a whole may be referred to as a computer system, or the server system 1100 and the user terminal 1500 may each be referred to as an individual computer system.

The communication line 9 is a communication channel that enables data communications. Specifically, the communication line 9 includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The server system 1100 includes a main body device 1101, a keyboard 1106, a touch panel 1108, and a storage 1140. A control board 1150 is provided in the main body device 1101.

The control board 1150 includes a processor of various types (e.g., a central processing unit (CPU) 1151, a graphics processing unit (GPU), and a digital signal processor (DSP)), an IC memory 1152 of various types (e.g., a video random access memory (VRAM), a RAM, and a read only memory (ROM)), and a communication device 1153. The control board 1150 may partially or entirely be implemented with an application specific integrated circuit (ASIC), a field-programmable gate array (FPGA), and a System on a Chip (SoC).

Through a calculation process performed by the control board 1150 based on a predetermined program and data, the server system 1100 implements 1) a user management function related to user registration and the like 2) an online shopping function of selling various items, usable in the game, to the user online, and 3) a game management function of providing data required to play the game with the user terminal 1500, to manage play control on the game played with the user terminal 1500. Thus, the game according to the present embodiment is implemented as one type of client-server online games.

The server system 1100 is illustrated/described as a single server. Alternatively, a plurality of blade servers, in charge of various functions, may be installed while being connected to each other via an internal bus to be capable of performing data communications with each other. Furthermore, a plurality of independent servers, disposed in locations distant from each other, may perform data communications with each other via the communication line 9 to function as the server system 1100 as a whole.

The user terminal 1500 is a computer system, usable by a registered user serving as a player to play the game, and is an electronic device (electronic apparatus) that can access the server system 1100 via the communication line 9 to implement an online game. The user terminal 1500 according to the present embodiment is a device known as a smartphone. The user terminal 1500 may also be a portable game device, a game controller, a personal computer, a tablet computer, a wearable computer, an arcade game device, or the like.

The user terminal 1500 includes an arrow key 1502, a button switch 1504, a touch panel 1506 that functions as an image display device and as a touch position input device, a speaker 1510, a built-in battery 1509, a microphone 1512, a control board 1550, and a memory card reader 1542 that can write and read data to and from a memory card 1540 that is a computer readable storage medium. The user terminal 1500 further includes a power button, a volume control button, and the like (not illustrated). Furthermore, the user terminal 1500 may be provided with an IC card reader that can implement contactless writing and reading of data to and from an IC card as a credit card or a prepaid card usable for payment involved in playing the game, and a position measurement module such as a GPS module.

The control board 1550 includes a processor of various types (e.g., a CPU 1551, a GPU, and a DSP); an IC memory 1552 of various types (e.g., a VRAM, a RAM, and a ROM), a wireless communication module 1553 for performing wireless communications with a mobile phone base station, a wireless LAN base station, or the like connected to the communication line 9, an interface circuit 1557; and the like.

The interface circuit 1557 includes circuits such as a driver circuit that drives the touch panel 1506, a circuit that receives signals from the arrow key 1502 and the button switch 1504, an output amplifier circuit that outputs a sound signal to the speaker 1510, an input signal generation circuit that generates a signal corresponding to the sound collected by the microphone 1512, and a signal input-output circuit that inputs and outputs a signal to and from the memory card reader 1542.

The elements mounted on the control board 1550 are electrically connected with each other via a bus circuit or the like to be capable of exchanging data and signals. The control board 1550 may partially or entirely be implemented with an ASIC, an FPGA, or a SoC. The control board 1550 stores a client program and various types of data, for implementing a function as a user terminal of the game according to the present embodiment, in the IC memory 1552.

The client program and various types of setting data are downloaded by the user terminal 1500 from the server system 1100 in the present embodiment. The program and the data may also be read from a storage medium such as the memory card 1540 additionally provided.

[Reward for Watching Advertisement]

FIG. 2 is a first diagram illustrating how a reward for watching an advertisement is set according to the present embodiment.

In the present embodiment, a player 2 performs a predetermined game play start operation on the user terminal 1500 to start playing an online game. The online game may be of any appropriate genre such as an action roll playing game (ARPG), a shooting game, or a puzzle game, for example. The touch panel 1506 of the user terminal 1500 displays a game screen W2 of the game being played, as well as a menu screen before the game is played (including menu items such as 1) online shopping, 2) party organization, 3) equipment change, 4) start game, 5) friend registration, and 6) chat, in an example of an ARPG), a result display screen after the game play, and the like. These statuses before the game play, during the game play, and after the game play are hereinafter collectively referred to as a "game play status".

An offer display section 10, related to displaying of a reward advertisement, is displayed on the game screen W2 when the game play status is regarded as an "offer timing", for displaying an advertisement display offer, after the online game has been started to be played.

The offer timing is a timing, before the game play, during the game play, or after the game play, such as a game play status where no urgent operation input is required from the player and a game play status where no instruction operation input is acceptable. Specifically, the offer timing may be A) a timing at which a screen is switched, B) a timing at which the game progress satisfies a given change condition, and C) a timing in a status where no instruction operation for the game play by the player is acceptable.

More specifically, a settable offer timing before the game play includes 1) a timing immediately after the login, 2) an input wait timing during a period while a menu screen is being displayed after the login, 3) a timing of transition from the menu screen to a sub menu screen or execution of a menu item, 4) after purchasing in the online shopping, 5) before or after the party organization, 6) before or after equipment of a player character is changed, 7) before or after the friend registration, 8) before or after chatting, and 9) during data loading.

A settable offer timing during the game play includes 10) immediately after the game screen W2 is displayed, 11) while an operation menu is being called, 12) after player character level up notification, 13) after a battle, 14) after a stage is finished, 15) during data loading for transitioning to a new stage, 16) immediately after the transition to the new stage, and 17) immediately after a boss character appears.

A settable offer timing after the game play includes 18) after notification of a result of the game play that has just ended and 19) immediately before, during, and immediately after data save.

When the player inputs a predetermined confirmation operation on the offer display section 10, an advertisement display 20 starts to be displayed. Thus, when the game play status satisfies the timing condition set as a timing at which a given advertisement is displayed, display control for the advertisement display 20 is performed.

In the present embodiment, the player can stop the advertisement display 20 that has started, at any timing. A reward for watching the advertisement is given to the player when the player stops the advertisement display 20 or when a predetermined period of time of displaying is completed. In the present embodiment, this "reward" is denoted with a reference numeral "14" in the figure.

The reward, which may be any reward appropriately set in accordance with the content of the game as long as the reward can be used in the game, include, for example, 1) item usable by a player character (any type of item),
2) ticket to a stage, a field, and a dungeon,
3) free lottery ticket,
4) increasing number of character equipment slots,
5) increasing party size,
6) online shopping coupon,
7) discount ticket for playing fee,
8) event participation ticket,
9) rematch ticket,
10) game currency,
11) exp,
12) skill,
13) player title, 14) color setting and decoration element for a player character or the like, 15) new player character, or the like.

A first feature of the present embodiment is that the type of the reward to be given can be changed in accordance with the offer timing, that is, a timing at which the advertisement is displayed. Specifically, a standard reward, for watching the advertisement, set in advance for the advertisement display 20 is changed to set the reward to be actually given.

Next, specific screen display elements related to the reward advertisement according to the present embodiment are described.

FIG. 3 is a diagram illustrating a display example of the offer display section 10 according to the present embodiment.

The offer display section 10 is an input screen for obtaining player's confirmation for the advertisement display, and notifies the player of information on the reward to be given to the player after watching the advertisement in advance. The offer display section 10 may be displayed through a popup display on the game screen W2 or by switching a certain display range on the screen (for example, a display section, other than a game display section, in a lower section of the display screen).

The offer display section 10 according to the present embodiment includes a to-be-displayed advertisement notification section 11, a to-be-given reward notification section 13, an advertisement display size selection section 15, an advertisement display denying operation input icon 17, and an advertisement display confirmation operation input icon 19.

The to-be-displayed advertisement notification section 11 describes an overview of the offer related advertisement to be displayed. When a plurality of advertisements are displayed in series in a single watching time, the information on the plurality of advertisements is displayed on the to-be-displayed advertisement notification section 11. A thumbnail of the advertisement, a category of the advertisement, a product name, an advertisement type (e.g., movie/still image), a display time period, and the like may be appropriately set as the information on the advertisement as used herein.

Information on a reward to be given when the advertisement, indicated by the to-be-displayed advertisement notification section 11, is entirely watched is displayed on the to-be-given reward notification section 13. This information includes the content of the reward and a message indicating that the reward can change. In an example of an item, the reward content preferably includes information related to the name of the item and a standard quantity given. The reward content clearly indicated in the to-be-given reward notification section 13 is referred to as "standard reward". In the present embodiment, the content of the reward to be actually given is obtained by changing the standard reward in accordance with an advertisement watching status or the like.

The advertisement display size selection section 15 receives designation/selection of a displayed size of the advertisement to be displayed related to the offer. The type of the display size can be set as appropriate. For example, three sizes of large, medium, and small can be prepared. The large size includes full screen display. The medium size and the small size may each be a predetermined display area (for example, a display area of an operation menu) in a screen layout, a strip-shaped area along a screen edge portion, or a strip-shaped area at the center of the screen, and are preferably distinguished from each other, based on an occupying area, relative to the full screen.

FIG. 4 is a diagram illustrating a display example of the advertisement display 20 according to the present embodiment.

The advertisement display 20 includes an advertisement main section 21, a watched amount gauge 23, a reward change boundary 25 (25a, 25b), an obtained reward notification section 26, and a watching stop operation icon 27.

The advertisement main section 21 is a still image or a movie of an advertisement.

The watched amount gauge 23 indicates the ratio of a currently watched amount to the entire watched amount of the advertisement main section 21.

The reward change boundary 25 indicates a boundary at which the standard reward, indicated by the to-be-given reward notification section 13, changes. In the illustrated example, the reward change boundaries 25a at which the number of items determined to be given as the standard reward is determined one by one, and the reward change boundary 25b indicating that an item, different from the item to be given as the standard reward, is additionally given are illustrated as an example.

The obtained reward notification section 26 displays a reward to be given as a result of a watching stop operation performed at the current point.

The watched amount gauge 23 with the reward change boundary 25 (25a, 25b, . . . ) enables the player to recognize how much the advertisement has been watched so far and the reward to be obtained in accordance with the watching amount, and thus can be incentivized to watch the advertisement.

When the watching stop operation icon 27 is operated, the advertisement display 20 is deleted from the game screen, and the advertisement watching stops.

FIG. 5 is a diagram illustrating a display example of a reward giving notification 30 notifying the player that the reward has been given. The reward giving notification 30 includes a standard reward notification section 31, a changed reward notification section 33, a changed reason notification section 35, and a notification display cancel operation section 37. The changed reward notification section 33 indicates that an item is added or reduced to or from the standard reward. The changed reason notification section 35 indicates the reason why the reward has changed.

The reward giving notification 30 indicates the standard reward and a reward as a result of changing the standard reward separately from each other, and clearly indicates the reason of the change, so that the player can be more incentivized to watch the advertisement next time.

With the reward thus changed, the player offered with the same advertisement again can expect that "maybe the reward better than or different from the last time can be obtained because the offer is at the timing different from the last time". Thus, an offer to display the same advertisement is less likely to be denied due to a reason that the player has "already seen the advertisement", whereby the player can be more incentivized to watch the reward advertisement.

In the present embodiment, the content of the reward to be actually given to the player changes in accordance with the offer timing as illustrated in FIG. 2, and may also change based on various types of information described below.

FIG. 6 is a second diagram illustrating how a reward for watching an advertisement is set according to the present embodiment. Specifically, the figure illustrates how the reward changes in accordance with play data related to the current game play condition.

When the player 2 starts the game play, information indicating the latest game play status is managed as play data 700 while being associated with identification information (for example, an account) on the player 2. In the present embodiment, the content of the reward 14 actually given to the player 2 is determined in accordance with the content of the play data.

The content of the play data 700, which can be set as appropriate in accordance with the content of the game, may be information including: a player character level (or a player level or a play level) indicating the skill of the player; play date and time; play time indicating a period of time elapsed after the game play has started; a game progress (for example, a list of finished stages in an example of a stage-based game) indicating a progress of the game; a play result; and a possessed item.

In an example of the game progress, the content of the reward 14 to be actually given may be different between a case where an advertisement is watched in the early half of a game story and a case where the same advertisement is watched in the later half.

Thus, the player offered with the same advertisement again in the second half of the story can expect that "maybe a better reward or a different reward can be obtained because the game play condition is different from the last time". Thus, displaying of the advertisement is less likely to be denied due to the reason that the player has "already seen the advertisement", whereby the player can be more incentivized to watch the reward advertisement.

FIG. 7 is a third diagram illustrating how a reward for watching an advertisement is set according to the present embodiment. Specifically, the figure illustrates how the reward changes in accordance with user management data (user data) related to the past game play.

Each time the player 2 ends the game play, information indicating the current game play status is managed as user management data 600 while being associated with the identification information (for example, an account) on the player 2. In the present embodiment, the content of the reward 14 to be actually given to the player 2 is determined in accordance with the content of the user data.

The content of the user management data 600, which can be set as appropriate in accordance with the content of the game, may include information on each of "play history", "charge history", and "reward acquisition history". Note that information other than these may be included.

Specific examples of the information on the play history may include a total number of play times indicating the total number of times the game has been played, a total play time indicating the total period of time the game has been played, and a play frequency.

The charge history may also be regarded as information, that is, charge information on charging confirmed by the player so far. Specific examples of the information may include the total number of charge times or the total charge amount related to purchasing of an item or the like usable in the game, charge frequency, and a preference of purchased items. A configuration where the information further includes a playing fee and an event participation fee for calculating the total number of charge times or the total charge amount as appropriate may be employed.

Specific examples of the information on the reward acquisition history may include a list of rewards acquired so far, the number of times the same reward has been acquired, and a reward category ranking.

The user management data 600 may further include personal information (gender, age, and the like for example) on the player as appropriate.

Thus, for example, the player offered with the same advertisement again while playing the game several times can expect that "maybe the reward better than or different from the last time can be obtained because the game play result is different from the last time". Thus, the advertisement display is less likely to be denied due to the reason that the player has "already seen the advertisement", whereby the player can be more incentivized to watch the reward advertisement.

FIG. 8 is a fourth diagram illustrating how a reward for watching an advertisement is set according to the present embodiment. Specifically, the figure illustrates how the reward changes in accordance with the current advertisement watching status.

When the advertisement display 20 starts to be watched, data indicating the current advertisement watching status is managed while being associated with the identification information (for example, an account) on the player 2. In the present embodiment, the content of the reward 14 to be actually given to the player 2 is determined in accordance with this data indicating the current advertisement watching status.

The content of the data indicating the current advertisement watching status can be set as appropriate. For example, the data may include the number of watched times indicating the total number of watched advertisements, the watched amount indicated by the watched amount gauge 23, the display size of the advertisement display 20, and watching time.

Thus, the player offered with the same advertisement again can expect that "maybe the reward better than or different from the last time can be obtained when the advertisement is watched with a display size different from the last time". Thus, the advertisement display is less likely to be denied due to the reason that the player has "already seen the advertisement", whereby the player can be more incentivized to watch the reward advertisement.

Furthermore, in the present embodiment, as illustrated in FIG. 2, and FIG. 6 to FIG. 8, the content of the reward actually given to the player changes in accordance with various types of information, and the advertisement to be displayed next is selected in accordance with the user management data 600 on the past advertisement watching history, the play history, the charge history, and the like.

FIG. 9 is a diagram illustrating how the advertisement to be displayed next is selected according to the present embodiment. In the present embodiment, information on the advertisement display 20 (20*a*, 20*b*, . . . ) that has been watched by the player 2 so far is included, as the advertisement watching history, in the user management data 600 to be managed.

The detail of the advertisement watching history can be set as appropriate. For example, the category (classification information indicating the detail) of the watched advertisement and the total number of watched times of the advertisement, the category and the total watching time, or the like may be set. This information on the advertisement watching history may be regarded as indicating the category of an advertisement the player is interested in.

The information on the play history and the charge history in the user management data 600 serves as an index indicating whether or not the player has just started playing the game, whether or not the player is enjoying the game for a long period of time, and how frequently the player is purchasing items.

Thus, an advertisement 20x to be displayed next may be selected in accordance with the user management data 600 including the advertisement watching history, so that the advertisement can be effectively implemented based on estimated behavior and preference of the player.

[Functional Configuration]

FIG. 10 is a functional block diagram illustrating an example of the functional configuration of the server system 1100 according to the present embodiment. The server system 1100 according to the present embodiment includes an operation input section 100s, a server processing section 200s, a sound output section 390s, an image display section 392s, a communication section 394s, and a server storage section 500s.

The operation input section 100s is for inputting various operations for management. The keyboard 1106 in FIG. 1 corresponds to this section.

The server processing section 200s is implemented by electronic parts such as a processor (e.g., a CPU and a GPU), an ASIC, and an IC memory. The server processing section 200s controls data exchanged between functional sections including the operation input section 100s and the server storage section 500s, and performs a calculation process based on a predetermined program, data, the operation input signal from the operation input section 100s, data revived from the user terminal 1500, and the like to entirely control the operation of the server system 1100.

The server processing section 200s according to the present embodiment includes a user management section 202, an online shopping management section 210, a game management section 220, a timer section 280s, a sound generation section 290s, an image generation section 292s, and a communication control section 294s. Note that functional sections other than these may be included as appropriate.

The user management section 202 performs a process related to a user registration procedure and stores and manages the data associated with the account (user ID). In the present embodiment, the section has various functions including: 1) issuing an account to a registered user; 2) registration information management for registering and managing personal information for each account; 3) book keeping management for a payment medium consumed for paying for a charged element related to the game (for example, the game play, charged lottery, online shopping, and the like); and 4) play history management for managing login/logout history. Note that any other appropriate management function for data associated with the account can be included.

The online shopping management section 210 is in charge of control related to the online shopping that is one of the charged elements, and can be implemented with a known online shopping technique. In the present embodiment, the player can purchase items, an executable lottery ticket, an event participation ticket, and the like through online shopping. Any other elements may be set as appropriate to be sold in the online shopping.

The game management section 220 performs various processes related to game play management. The game according to the present embodiment is a client-server online game, and thus the game management section 220 communicates with the user terminal 1500 to perform control for providing data required for the game play.

Specifically, the game management section 220 includes an advertisement display control section 230, an advertisement display stop control section 236, a reward setting section 240, a reward giving section 250, a changed content notification control section 252, a changed reason notification control section 254, a watched amount and determined reward notification control section 256, and an advertisement display suppression control section 258. Note that other functional sections other than these may be included as appropriate.

The advertisement display control section 230 performs control to display a given advertisement when the game play status satisfies the timing condition determined as a timing at which the given advertisement is displayed. Specifically, the control to display the advertisement can be performed with the timing satisfying the timing condition set to be a timing including: a given screen switching timing (for example, a screen switching timing when a given game progress unit starts or ends); a timing at which the game progress satisfies a given change condition (for example, a timing at which the play level of the player changes); and a timing in a status where no instruction operation for the game play by the player is acceptable. Ongoing advertisement displaying can be stopped before the displaying is completed, when a watching stop operation is performed by the player.

The advertisement display control section 230 according to the present embodiment includes an advertisement setting section 232 and an offer control section 234.

The advertisement setting section 232 sets an advertisement to be displayed or an option of the advertisement to be displayed, in accordance with the game play status and/or the play history.

When the timing condition is satisfied, the offer control section 234 offers the player to watch a given advertisement with a standard reward. In the present embodiment, this corresponds to the display control for the offer display section 10 (see FIG. 3). Thus, the advertisement display control section 230 according to the present embodiment starts the display control for the advertisement when the player performs the confirmation operation for the offer.

The advertisement display stop control section 236 performs control to stop the ongoing displaying of a given advertisement based on the watching stop operation performed by the player, before the display control for the reward advertisement starts.

The reward setting section 240 sets the reward for watching the advertisement, given to the player, in accordance with the user data and/or the play data on the player related to the game. Specifically, the reward can be set based on the charge information such as a charge history of the player or the like. In this process, charged elements such as a purchased item as well as categories set in advance for the charged elements may be ranked. Thus, the reward for watching the advertisement can be set as a reward associated with a charged element satisfying a predetermined high frequency or high price charge condition, based on the ranking result.

The reward setting section 240 according to the present embodiment includes a standard reward setting section 242 and a change section 244.

The standard reward setting section 242 sets the standard reward for watching an advertisement, for the advertisement. Specifically, a reward determined to be associated with an advertisement to be displayed can be set as the standard reward, in accordance with the user data and/or the play data on the player related to the game.

The change section 244 changes the standard reward to set the reward to be actually given, and can set the reward to be actually given in accordance with the watched amount of the advertisement. Specifically, the setting is performed with the standard reward changed in accordance with the user data and/or the play data on the player related to the game. More specifically, the standard reward is changed based on the watching history of the offered advertisement watched by the player in the past.

The reward giving section 250 gives the reward to the player.

The changed content notification control section 252 performs control to issue a notification indicating the content of the change by the change section 244. In the present embodiment, this corresponds to the display control for the changed reward notification section 33 in the reward giving notification 30 (see FIG. 5).

The changed reason notification control section 254 performs control for issuing a notification indicating the reason of the change made by the change section 244. In the present embodiment, this corresponds to the display control for the changed reason notification section 35 in the reward giving notification 30 (see FIG. 5).

The watched amount and determined reward notification control section 256 performs control to display the current watched amount and a reward to be given when the watching stop operation is performed. In the present embodiment, this corresponds to the display control for the watched amount gauge 23 and the obtained reward notification section 26 in the advertisement display 20 (see FIG. 4).

The advertisement display suppression control section 258 suppresses the advertisement display by the advertisement display control section 230, based on the charge information on the player.

The timer section 280s uses a system clock to obtain the current date and time, a time limit, and the like.

The sound generation section 290s is implemented by an integrated circuit (IC) or by executing software that generates sound data and performs decoding, and generates or decodes sound data on a sound related to system management for the server system 1100 or related to the game play, background music (BGM), and a character voice. The resultant sound signal related to the system management is output to the sound output section 390s.

The sound output section 390s receives the sound signal to emit the corresponding sound, and corresponds to a speaker (not illustrated) of the main body device 1101 or the touch panel 1108 in the example illustrated in FIG. 1.

The image generation section 292s can generate an image related to the system management for the server system 1100, a game image (or data for displaying the game image on the user terminal 1500), and the like. The image related to the system management can be output to the image display section 392s.

The image display section 392s displays various images for system management based on the image signals input from the image generation section 292s. The image display section 392s may be implemented by an image display device such as a flat panel display, a cathode-ray tube (CRT), a projector, or a head-mounted display. The image display section 392s corresponds to the touch panel 1108 in the example illustrated in FIG. 1.

The communication control section 294s performs a data process related to the data communication, and exchanges data with an external device through the communication section 394s. In the present embodiment, a process related to the data communications with the user terminal 1500 is performed.

The communication section 394s connects to the communication line 9 to implement communications. The communication section 394s is implemented by a transceiver, a modem, a terminal adapter (TA), a jack for a communication cable, a control circuit, and the like. In the example illustrated in FIG. 1, the communication device 1153 corresponds to the communication section 394s.

The server storage section 500s stores a program and various types of data for implementing various function of the server processing section 200s for entirely controlling the server system 1100. The server storage section 500s is used as a work area for the server processing section 200s, and temporarily stores the results of calculations performed by the server processing section 200s based on various programs. The function of the server storage section 500s is implemented by an IC memory (e.g., RAM and ROM), a magnetic disk (e.g., hard disk), an optical disk (e.g., CD-ROM and DVD), an online storage or the like corresponding to a storage medium such as the IC memory 1152 and hard disk mounted in the main body device 1101 and the storage 1140, in the example illustrated in FIG. 1.

FIG. 11 is a diagram illustrating an example of a program and data stored in the server storage section 500s according to the present embodiment. The server storage section 500s stores therein in advance, a server system program 501, a server program 503, a distributed game client program 505, online product defining data 509, game initial setting data 510, category association level defining data 512, an advertisement database 514, and reward defining data 550.

The server storage section 500s stores data, sequentially generated and managed, including user management data 600, play data 700, and current date and time 800. Furthermore, information on a timer, a counter, various flags, and the like may be stored as appropriate.

The server system program 501 is read out and executed by the server processing section 200s for causing the server system 1100 to implement a basic input/output function required for a computer.

The server program 503 is read out and executed by the server processing section 200s for implementing functions of the user management section 202, the online shopping management section 210, and the game management section 220 (see FIG. 10).

The distributed game client program 505 is an original of a game client program provided to the user terminal 1500.

The online product defining data 509 is data defining a product purchasable through the online shopping implemented by the online shopping management section 210 (see FIG. 10). One online product defining data 509 includes a unique product type (for example, an item type or the like), a purchasing cost, a quantity given, and a product category associated with each other. It is a matter of course that information other than these may be included as appropriate.

The game initial setting data 510 includes various types of initial setting data, defining data, and the like for executing the game according to the present embodiment.

The category association level defining data 512 defines the level of association between a product category of an online product and an advertisement category set in advance for each advertisement. For example, as illustrated in FIG. 12, the association level is defined in a matrix of a product category 512a and an advertisement category 512b. In the illustrated example, three levels of "high", "mid", and "low"

are set. Alternatively, the association level may be set with scores with the maximum value being "100 points" or "1.0".

The category association level defining data 512 is used for a target advertisement. Specifically, the advertisement category having a higher association level with respect to a category ranked highly in the product category ranking, based on the charge history of the player, is estimated to be more interesting to the player. Thus, the advertisement of this advertisement category is selected with a higher priority to be offered to the player.

Referring back to FIG. 11, the advertisement database 514 stores advertisement defining data 520 for each advertisement in the game. As illustrated in FIG. 13, each advertisement defining data 520 is data including: 1) a unique advertisement ID 521; 2) an advertisement category 522; 3) a timing condition 524 for defining a timing at which the advertisement is displayed; 4) advertisement offer data 526 defining what is displayed on the offer display section 10; 5) advertisement execution data 530 for implementing advertisement display; and 6) an applied reward ID 540. Note that other data can be included as appropriate.

The timing condition 524 is a timing condition defined as a timing at which the advertisement is displayed and defines a timing at which the offer display section 10 is displayed. In other words, a timing of displaying the advertisement and characteristics of a player who is a potential target of the advertisement are defined. The condition is set as appropriate in accordance with the sponsor of the advertisement.

FIG. 14 and FIG. 15 are each a diagram illustrating an example of a data structure of the timing condition 524.

The timing condition 524 according to the present embodiment is defined as an AND condition of conditions illustrated in the figures. Each specific condition, which can be changed as appropriate in accordance with the content of the game, is implemented with a combination of various parameter values each indicating a game play status. The conditions may each be set to be "not set as condition" (written as "not set" in the figure). A condition set to be "not set as condition" is ignored, and thus an AND condition with the remaining conditions is used. Thus, when only one condition is set and the remaining conditions are set to be "not set as condition", this only one condition is used.

Specifically, the timing condition 524 according to the present embodiment roughly includes "offer status condition", "player condition", "charge history condition (charge condition)", "reward history condition", "play history condition", and "advertisement watching history condition". Note that conditions classified in other categories may be included as appropriate.

As illustrated in FIG. 14, examples of the "offer status condition" according to the present embodiment include 1) an executed timing condition, 2) a play time condition, 3) a play date condition, 4) a play day of the week condition, 5) a current play time condition, 6) a game progress change condition, 7) an item consumption condition, 8) an instruction operation unacceptable status condition, and 9) a game progress unit condition. Note that other conditions can be included as appropriate.

The executed timing condition is a value indicating any one of before game play, during game play, after game play, and not set as condition.

The play time condition is set to be any one of a target time zone and not set as condition.

The play date condition is set to be any one of a target date range and not set as condition.

The play day of the week condition is set to be any one of a target day of the week list and not set as condition.

The current play time condition is a condition related to the time elapsed after the current game play has started, and is set to be any one of a target time range and not set as condition.

The game progress change condition is a condition related to the change in status regarding the game progress. For example, this corresponds to winning/losing of the player determined. However, the condition is not limited to the winning and losing. Depending on the content of a game, the condition may be a change in a parameter value, corresponding to the winning and losing in the game, such as a lap time, shooting hit rate, party loss rate, popularity, and favorability. Furthermore, the condition may also be set to be a change in a play level of a player character or a player, a hatching and evolution of a character, or the like. The game progress change condition is set to be any one of one or a plurality of these changes in status and not set as condition.

The item consumption condition is a condition related to consumption by the player for a predetermined item, and is set to be any one of a set of the identification information on a target item and a required consumption amount value and not set as condition. The target item as used herein is preferably set as an item to be a reward for watching the advertisement.

The instruction operation unacceptable status condition is set to be any one of an identifier indicating a target status in statuses where none of various instruction operations input by the player is acceptable (for example, screen switching, during loading, while a notification screen indicating the start or end of a battle is displayed) and not set as condition.

The game progress unit condition is a condition related to a given game progress unit. The process unit, which may be set as appropriate in accordance with the content of the game, may be defined by a change in (start/end of) a game stage or a map, arrival at a scenario turning point, arrival at a predetermined position in a game world, acquisition of a key item, defeating a key character, or the like. The game progress unit condition may be set to be any one of designation of start or end of the target process unit and not set as condition. In a case where start is designated, the timing condition is determined to have been satisfied when the target progress unit starts. In a case where end is designated, the timing condition is determined to have been satisfied when the target progress unit ends.

The "player condition" according to the present embodiment is a condition for designating a target player. For example, this condition includes 1) a character type condition indicating the type of a character used by the player, 2) a play skill condition, 3) a player gender condition, 4) a player age condition, 5) a progress condition, 6) a possessed item condition, and 7) a registered friend condition. Note that other conditions can be included as appropriate.

The character type condition is set to be any one of a list of target character types and not set as condition.

The play skill condition is set to be any one of a range or a threshold value of a target character level (or a range of a player level), and not set as condition.

The player gender condition is set to be any one of a target gender list and not set as condition.

The player age condition is set to be any one of a range or a threshold value of a target age and not set as condition.

The progress condition is set to be any one of a list of a game progress unit that should be reached by the player in the game progress units (for example, a scenario turning point, a stage, a course, a date in the game world, or the like) for managing the game progress and not set as condition.

The possessed item condition is set to be any one of a target item ID list indicating items that should be possessed by the player, the quantity of the items that should be possessed, and not set as condition.

The registered friend condition is set to be any one of a range or a threshold value of a target registered quantity indicating the number of friends that should be registered by the player, and not set as condition.

With these details thus set as appropriate, a desired advertisement can be offered in a status desirable by a sponsor for example. For example, the game progress unit condition may be set as a combination of "target progress unit=a special game stage for fighting with a boss character" and "start". The possessed item condition may be set to be "special healing item+10 (the number of the item that should be possessed)" and "strengthened weapon item+1". In this case, an advertisement set to be displayed may be an advertisement of an object that is advantageous or useful (for example, a special healing item or a strengthened weapon item useful in a battle against the boss) to be bought for the player in the current status before fighting the boss, when the game status is immediately before the battle with the boss. Furthermore, an advertisement of an item related to a character appearing in the battle against the boss to be started (a real item that cannot be used in the game) may be set to be displayed with the possessed item condition set to be a virtual item that cannot be possessed by the player in the first place.

As illustrated in FIG. 15, the "charge history condition" according to the present embodiment is a condition related to a charge history of a target player in the past and may also be referred to as a charge condition. For example, the condition includes 1) a total charge amount condition related to the total price payed for purchasing an item and the like and participating in an event, 2) a total number of charged times condition related to the number of times payment has been made for purchasing an item and for an event, 3) a current month charge amount condition related to the total charge amount in the latest unit accounting unit (for example, a month), 4) a current month number of charged times condition related to the total charged times in the latest unit accounting unit (for example, a month), 5) a charge frequency condition, and 6) a frequently purchased category condition related to a category of an item purchased. Note that other conditions can be included as appropriate.

The total charge amount condition and the current month charge amount condition are each set to be any one of a range or a threshold value of the total charge amount and not set as condition.

The total number charged times condition and the current month number of charged times condition may each be set to be a range or a threshold value of the total number of charged times and not set as condition.

The charge frequency condition is set to be any one of a range or a threshold value of the frequency and not set as condition.

The frequently purchased category condition is set to be any one of a list of categories of target items purchased and not set as condition.

For example, the "reward history condition" according to the present embodiment includes 1) a number of reward acquired times condition related to the number of times a reward, for watching a reward advertisement, has been acquired by the player so far, and 2) the number of same reward acquired times condition related to the number of times the same reward has been acquired. Note that other conditions can be included as appropriate.

The number of reward acquired times condition is set to be any one of a range or a threshold value of the number of times and not set as condition.

The number of same reward acquired times condition is set to be any one of a combination of a reward ID identifying a target reward type and a range of the number of times the target reward has been acquired and not set as condition. One or a plurality of combinations of the reward ID and the range of the number of times may be used.

For example, the "play history condition" according to the present embodiment includes 1) a total play time condition related to the total play time of the player so far, 2) the total number of times the game has been played condition related to the total number of times the game has been played, and 3) and a play frequency condition. Note that other conditions can be included as appropriate.

The total play time is set to be any one of a range or a threshold value of the total play time and not set as condition.

The total number of play times condition is set to be any one of a range or a threshold value of the total number of times the game has been played and not set as condition.

The play frequency is set to be any one of a range or a threshold value of the frequency and not set as condition.

For example, the "advertisement watching history condition" according to the present embodiment includes 1) a total number of watched times condition related to the total number of times the player has watched the reward advertisement so far, 2) a total watching time condition related to the total watching time of the reward advertisement, and 3) a frequently watched category condition related to the advertisement category of the reward advertisement watched. Note that other conditions can be included as appropriate.

The total number of watched times condition is set to be any one of a combination of an advertisement category of a reward advertisement and a range or a threshold value of the total number of watched times of the advertisement in the category and not set as condition.

The total watching time condition is set to be any one of a combination of an advertisement category of a reward advertisement and a range or a threshold value of the total watching time of the advertisement in the category and not set as condition.

The frequently watched category condition is set to be any one of a list of one or a plurality of advertisement categories and not set as condition.

Referring back to FIG. 13, the advertisement offer data 526 defines various types of data for displaying the offer display section 10 (see FIG. 3). For example, the data includes text data and image data such as an icon.

The advertisement execution data 530 includes data for implementing the advertisement display 20 (see FIG. 4). In the present embodiment, one advertisement defining data 520 includes one or a plurality of pieces of advertisement execution data 530 that start in response to a confirmation operation on the offer display section 10.

One advertisement execution data 530 includes a display order 532 as well as a designated display size 534 and advertisement main section data 536 associated with each other. Note that other data can be included as appropriate.

The designated display size 534 corresponds to a display size selectable with the advertisement display size selection section 15 in the offer display section 10 (see FIG. 3).

The advertisement main section data 536 is data for implementing the advertisement main section 21 (see FIG. 4) of the advertisement display 20. The content of data such as text data, still image data, movie data, script data, 3DCG modeling data, and texture data can be set as appropriate depending on how the advertisement main section 21 is implemented.

The applied reward ID 540 is data indicating which reward is applied to an advertisement to be watched based on the advertisement defining data.

Referring back to FIG. 11, the reward defining data 550 is prepared for each type of a reward for watching an advertisement, in other words, each option of the applied reward ID 540, and defines a content of the reward. For example, as illustrated in FIG. 16, one reward defining data 550 include a unique reward ID 551, a target advertisement ID list 553, standard reward data 555, and reward change setting data 560. Note that other data can be included as appropriate.

The reward ID 551 is an ID settable to the applied reward ID 540.

The target advertisement ID list 553 is a list of the advertisement IDs 521 (see FIG. 13) to which the defining data is applied.

The standard reward data 555 defines a standard content of the reward. The content can be set as appropriate in accordance with the type of game. In the present embodiment, the content of the reward is changed from the standard content.

For example, the reward to be given may be an item (for example, equipment of a player character, a lottery ticket, a ticket to a new dungeon or map, a game currency, a title, a player character color setting, sound data on words of a player character read by a voice actor, and the like). In such a case, the standard reward data 555 includes one or a plurality of sets of a given item ID indicating the type of an item to be given and the number of the given items.

The reward may be increase/decrease of an ability parameter value of the player character (for example a skill, energy, hit point, attack power, defense power, mobility, popularity, favorability, and the other like parameters that can be set as appropriate in accordance with the content of the game). In such a case, the standard reward data 555 may include one or a plurality of sets of the type of target ability parameter value and an increased/decreased amount.

The reward may be implemented as a coupon given. In such a case, one or a plurality of sets of the type of the coupon and the number of coupons to be given may be included.

The reward may be implemented as rental of a rental character usable as a player character. In such a case, the standard reward data 555 may include one or a plurality of sets of settings on the type and an ability parameter value of the rental character and a condition on a rental period and returning.

Numerical values such as the given quantity, the given amount, the increase/decrease amount, the rental period, and the scale factor set with the standard reward data 555 may be fixed values or may be determined with a predetermined function (f{X1, X2, ... } in the figure) using various variable parameter values (X1, X2, ... in the figure) related to the current and past play statuses, the game play status, the advertisement watching history, and the like of the player. Furthermore, the values may be determined using table data using various parameter values as arguments, instead of the function.

For example, the variable parameter value may be one or a plurality of 1) a number indicating the number and the type of the rewards that have been acquired by the player, 2) data representing the game progress status including, for example, a progress unit number of a currently playing game stage or the like, a scenario number, and the like, 3) a play level indicating the skill of the player (may be a level of the player character), 4) the total number of play times or the total play time, the total charge amount or the total number of charged times within a predetermined period between a user registration point and the current point (for example, up until the current point, the current month, the previous month, two weeks, or the like), 5) the number of registered friends, 6) the number of possessed rare items and rare characters, and 7) the number of watched times, the watching time, or the average watched amount obtained from the past watching history of an advertisement.

The reward change setting data 560 is data defining how the content defined by the standard reward data 555 is changed and a condition of the change. In the present embodiment, the data is prepared for each category of the condition for the change.

For example, FIG. 17 to FIG. 22 are diagrams illustrating examples of data structures of the reward change setting data 560, and illustrate different categories of a change executing condition. The reward change setting data 560 includes a change executing condition 561, a changed content 563, and reward giving notification setting data 565. Note that other data can be included as appropriate.

The change executing condition 561 defines a condition for changing the content defined by the standard reward data 555.

The changed content 563 defines how the content defined by the standard reward data 555 is changed. For example, when the standard reward data 555 is set to be giving an item, increase/decrease of the giving quantity can be set. Furthermore, a reward, different from the item defined by the standard reward data 555, to be added can be set. In the illustrated example, an example where an additional item ID is set is illustrated. The changed content 563 may be set to be increase/decrease of the ability parameter value of a player character, giving coupon, rental of a rental character usable as the player character, and the like, as in the case of setting the reward in the standard reward data 555.

The reward giving notification setting data 565 defines a content of the notification issued by the reward giving notification 30 (see FIG. 5). For example, the reward giving notification setting data 565 includes information such as an image and a text displayed with the standard reward notification section 31 and the changed reward notification section 33 and a text displayed with the changed reason notification section 35.

As illustrated in FIG. 17, for example, the change executing condition 561 related to an offer status may be set to be a change in the offer timing (for example before the play, during the play, and after the play) or a change in the play level of the player (for example, a player level or a player character level), predetermined day of the week, predetermined time, predetermined date, a current status related to winning or losing of the player, a status related to the ability parameter value of the player character (in the illustrated example, an example where the hit point is less than 20% is illustrated), a status related to an equipped item (for example, broken, expired, disabled, no remaining energy or bullets), or the like. The condition may be set to be a predetermined gender, a predetermined residential area, or the like, depending on the type of information at the time of user registration.

As illustrated in FIG. 18, for example, the change executing condition 561 related to the charge history (charge information) may be set to be a range of the total charge amount and the current month charge amount or a timing at which the amounts first reach a predetermined value, a range of the total number of charged times and the current month number of charged times or a timing at which these values have reached a predetermined value, and a case where the advertisement category of the watched advertisement is highly associated with the a predetermined rank in the ranking or higher, or the like. The change executing condition 561 may further be set to a charge frequency range or the like.

As illustrated in FIG. 19, for example, the change executing condition 561 related to the reward history (a history of the rewards that have been acquired by the player in the past) may be set to be a range of the number of reward acquisition times, a range of the number of times the same reward has been acquired, a timing at which these values have reached a predetermined value for the first time, whether or not there is a history of acquiring a predetermined type of reward, or the like. Note that other conditions can be included as appropriate.

As illustrated in FIG. 20, for example, the change executing condition 561 related to the play history of the player may be set to be the total play time, the total number of play times, a timing at which these values have reached a predetermined value for the first time, whether or not there is a history of an occurrence of a predetermined event, or the like. Note that other conditions can be included as appropriate.

As illustrated in FIG. 21, for example, the change executing condition 561 related to the advertisement watching history of the player may be set to be the total number of watched times, the total watching time, the current month number of watched times, current month watching time, the total number of watched times within the current day, the total watching time within the current day, the number of times the same advertisement has been watched, the watching time of the same advertisement, the total play times per day, a timing at which these values have reached a predetermined value for the first time, whether or not there is a history of an occurrence of a predetermined event, or the like. Note that other conditions can be included as appropriate.

As illustrated in FIG. 22, for example, the change executing condition 561 related to the display status (advertisement display status) of the currently displayed advertisement display 20 (see FIG. 4) may be set to be a display size, a range of a watched amount, the type of an advertisement, or the like. Note that other conditions can be included as appropriate. The watching amount is set in such a manner that 100% is achieved when the entire advertisement execution data 530 in the advertisement defining data 520 (see FIG. 13) is watched. Specifically, when a plurality of advertisements are sequentially displayed, the amount may be a rate of the number of completely watched advertisements or may be a rate of a period between the start of the watching and the timing of the watching stop operation to a time required for watching all of the advertisements entirely.

Referring back to FIG. 11, the user management data 600 is prepared for each registered user, that is, for each player, and includes various types of data associated with the user account. In other words, the data is first play information on a player related to a game.

For example, as illustrated in FIG. 23, one user management data 600 includes a unique user account 601, a registered age 602, a registered gender 604, payment medium accounting data 606, access history data 608, a registered friend list 610, advertisement watching history data 612, charge category ranking data 614, save data 620, and reward acquisition history data 630. Note that other data can be included as appropriate.

The payment medium accounting data 606 serves as what is known as an account book storing therein information on a charged/consumed amount of the payment medium associated with the user, information on a reason of the charging/consumption, and information on changed date and time in association with each other. This data can also be referred to as charge history data or charge information.

The access history data 608 is data in which the past game played timings are stored in series, and is automatically updated at a login/logout timing.

The registered friend list 610 is a list of user accounts of users acknowledged as friends by the player. New friend registration, deregistration, and the like can be performed through a predetermined registration procedure.

The advertisement watching history data 612 is generated each time the confirmation operation is performed for watching the advertisement, and includes various types of data indicating which advertisement has been watched, when was the advertisement watched, and how much the advertisement has been watched. For example, one advertisement watching history data 612 includes watched date and time, an advertisement ID, the watching amount, and the advertisement category in association with each other.

The charge category ranking data 614 is ranking data based on the payment medium accounting data 606. In the present embodiment, the data corresponds to a ranking of product categories of items or the like purchased (charged) in the online shopping, and is automatically updated each time the charging is performed.

The save data 620 includes various types of data indicating the game progress status at the previous game play. For example, the data includes a player character type 622, a player skill index 624, and possessed item data 626. Note that other data can be included as appropriate.

The possessed item data 626 is prepared for each type of an item usable in the game, and includes information indicating the possessed quantity of the item and the expiration date of the item, or the like. The data is automatically generated each time the item is purchased in the online shopping, and the possessed quantity is automatically updated each time the item is used during the game play. The data is automatically generated and updated also when the item is acquired as a clear bonus, a drop item, or the like during the game play.

The reward acquisition history data 630 is generated each time a reward for watching the advertisement is acquired. For example, one reward acquisition history data 630 includes acquisition date and time, a watched advertisement ID indicating the advertisement with which the reward is acquired, the reward ID, the standard reward, and a changed content in association with each other. Note that other data can be included as appropriate.

Referring back to FIG. 11, the play data 700 is prepared for each player (in other words for each user terminal 1500), and includes various types of data indicating the game play status. In other words, the data is second play information on the player related to the game, and is the game play status management data.

Specifically, one play data 700 includes, as illustrated in FIG. 24 for example, a player account 701 including a user account of a player, execution start date and time 703, game progress control data 710, offer display control data 720, advertisement display control data 722, reward giving notification display control data 724, advertisement watching history data 730, and reward acquisition history data 732. Note that other data can be included as appropriate.

The player account 701 indicates a player allocated with the data.

The game progress control data 710 is generated when the game play starts, and includes various types of data indicating a progress status during the game play. The detail of the data can be set as appropriate in accordance with the content of the game. For example, the data may be data including; a player character type; information on the current position in the game space; a list of ability parameter values of the character; an executed game progress unit indicating a game progress unit during the game play (for example, a stage, a scenario, a map, a time in the game world, or the like); a finished progress unit list indicating the finished units of the game progress units; an event occurrence history; and possessed item data. Note that other data can be included as appropriate. For example, a deck configuration list, the name of a song in a played game, a game difficulty setting, and the like may be included as appropriate in accordance with the detail of the game.

The offer display control data 720 includes various types of control data related to displaying on the offer display section 10 (see FIG. 3).

The advertisement display control data 722 includes various types of control data related to displaying on the advertisement display 20 (see FIG. 4). For example, the data includes a displayed advertisement ID, reference coordinates for determining the displayed position, the display size, a currently effective display order, the watched amount, the detail of the obtained reward, and the like. Note that other data can be included as appropriate.

The reward giving notification display control data 724 includes various types of control data related to displaying on the reward giving notification 30 (see FIG. 5).

Data with the same name as the advertisement watching history data 730 and the reward acquisition history data 732 is copied from the user management data 600 on a player before the game play and, updated during the game play. The resultant data is reflected on the user management data 600 after the game play.

FIG. 25 is a functional block diagram illustrating an example of a functional configuration of the user terminal 1500 according to the present embodiment. The user terminal 1500 according to the present embodiment includes an operation input section 100, a terminal processing section 200, a sound output section 390, an image display section 392, a communication section 394, and a terminal storage section 500.

The operation input section 100 outputs an operation input signal, based on various operations input by the player, to the terminal processing section 200, and can be implemented with a push switch, a joystick, a touch pad, a track ball, an accelerometer, a gyro, a CCD module, or the like. The operation input section 100 corresponds to the arrow key 1502, the button switch 1504, and the touch panel 1506 in FIG. 1.

The terminal processing section 200 is implemented by electronic parts such as a processor (e.g., CPU and GPU), an ASIC, and an IC memory. The terminal processing section 200 performs input/output control to exchange data with each of the functional sections including the operation input section 100 and the terminal storage section 500. The terminal processing section 200 executes various calculation processes based on a predetermined program or data, the operation input signal from the operation input section 100, and various types of data received from the server system 1100 to control the operation of the user terminal 1500. The terminal processing section 200 corresponds to the control board 1550 in FIG. 1. The terminal processing section 200 according to the present embodiment includes a user terminal calculation section 270, a timer section 280, a sound generation section 290, an image generation section 292, and a communication control section 294.

The user terminal calculation section 270 include an operation signal transmission control section 271, a game screen display control section 272, and a sound play control section 273.

The operation signal transmission control section 271 performs a process of transmitting various types of data and a request to the server system 1100 in accordance with an operation on the operation input section 100.

The game screen display control section 272 performs control for displaying a game screen based on various types of data received from the server system 1100. In this configuration, the server system 1100 generates the image of the game screen. Alternatively, a configuration where the user terminal 1500 generates the image may also be employed. In this configuration, the game screen display control section 272 may be in charge of controlling an object disposed in a virtual three-dimensional space for generating a 3DCG for example.

The sound play control section 273 performs control to emit a sound (for example, sound effects, a BGM, words read by a voice actor, and the like) based on various types of sound data received from the server system 1100.

For example, the sound generation section 290 is implemented with a processor such as a DSP or a sound synthesizing IC, an audio codec for playing a sound file, or the like, and generates a sound signal for sound effects, a BGM, various types of operation sound, words read by a voice actor, and the like related to the game, and outputs the signal thus generated to the sound output section 390.

The sound output section 390 is implemented with a device that outputs sound such as sound effects or a BGM, based on the sound signal received from the sound generation section 290. The sound output section 390 corresponds to the speaker 1510 in FIG. 1.

For example, the image generation section 292 is implemented by a processor (e.g., a GPU or a DSP), a video signal IC, a program (e.g., video codec), a drawing frame IC memory (e.g., frame buffer), and the like.

The image generation section 292 generates a game screen (image) every frame (e.g., 1/60th of a second) based on the various types of data received from the server system 1100, and outputs the image signal of the game screen to the image display section 392.

The image display section 392 displays various game images based on the image signals input from the image generation section 292. The image display section 392 may be implemented by an image display device such as a flat panel display, a CRT, a projector, or a head-mounted display. In the present embodiment, the touch panel 1506 illustrated in FIG. 1 corresponds to the image display section 392.

The communication control section 294 performs a data communication process for data communications, and exchanges data with an external device through the communication section 394. The communication section 394 connects to the communication line 9 to implement communications. For example, the communication section 394 is implemented by a transceiver, a modem, a TA, a jack for a communication cable, a control circuit, and the like, and corresponds to the wireless communication module 1553 in FIG. 1.

The terminal storage section 500 stores therein a system program for implementing various functions for causing the terminal processing section 200 to entirely control the user terminal 1500, a program and various types of data required for the game play, and the like. The terminal storage section 500 is used as a work area for the terminal processing section 200, and temporarily stores a result of calculation performed by the terminal processing section 200 in accordance with various programs, input data received from the operation input section 100, and the like. These functions are implemented by an IC memory (e.g., RAM and ROM), a magnetic disk (e.g., hard disk), an optical disk (e.g., CD-ROM and DVD), or the like, and correspond to the IC memory 1552 and the memory card 1540 in the control board 1550 illustrated in FIG. 1.

The terminal storage section 500 according to the present embodiment stores therein a terminal system program 502 and a game client program 504. Note that other data can be included as appropriate.

The terminal system program 502 is a program for causing the user terminal 1500 to implement a basic input/output function of a computer.

The game client program 504 is application software that implements a function of the user terminal calculation section 270 when read and executed by the terminal processing section 200, and may be embedded as a part of the terminal system program 502. In the present embodiment, the game client program 504 is a copy of the distributed game client program 505 (see FIG. 11) provided from the server system 1100.

The game client program 504 may be implemented with a dedicated client program or with a web browser program and a plugin that implements an interactive image display, depending on a technique and a method for implementing an online game.

[Operations]

Next, a flow of a process in the server system 1100 is described. The flow of the process described herein is implemented with the server processing section 200s executing the server program 503.

FIG. 26 and FIG. 27 are flowcharts illustrating a flow of a process in the server system 1100 according to the present embodiment, from login to logout performed by a player by operating his or her user terminal 1500. In the user terminal 1500, a game program according to the present embodiment, that is, the game client program 504 is assumed to have been started to be executed with the game play start operation by the player and thus is assumed to have been booted.

First of all, the server system 1100 executes a login process in accordance with a request from the user terminal 1500 (step S10). As a result, the play data 700 is generated (see FIG. 24). At this point, the game play has not technically started, and thus the game progress control data 710 is not generated. The offer display control data 720, the advertisement display control data 722, and the reward giving notification display control data 724 are not also generated at this point. The copy of the advertisement watching history data 612 and the reward acquisition history data 630 of the user management data 600 on the player is provided as the advertisement watching history data 730 and the reward acquisition history data 732 in the play data 700. When the login is completed, the server system 1100 executes the reward advertisement process (step S12).

FIG. 28 is a flowchart illustrating a flow of the reward advertisement process according to the present embodiment. In this process, first of all, the server system 1100 determines whether the predetermined advertisement display suppression condition is satisfied (step S28).

The "advertisement display suppression condition" is satisfied with a status deemed to be inappropriate for the sponsor or the game administrator to display the reward advertisement. For example, whether the charge amount of the player in the current accounting period has reached a predetermined reference high price value is determined, with reference to the payment medium accounting data 606 of the player (see FIG. 23). The advertisement display suppression condition may also be satisfied when the charge amount has satisfied a given low price condition, when the skill of the player has reached a predetermined level, when the game progress has reached a predetermined game progress, or in the other like conditions.

When the advertisement display suppression condition is satisfied (YES in step S28), the server system 1100 terminates the reward advertisement process.

When the advertisement display suppression condition is not satisfied (NO in step S28), the server system 1100 then refers to the advertisement database 514 to search for the advertisement defining data 520 (see FIG. 13) satisfying the timing condition 524 (step S30).

When the satisfying advertisement defining data 520 is found (YES in step S30), one of corresponding advertisements is randomly selected (step S32) and the offer display section 10 for the selected advertisement is displayed. Thus, the confirmation operation/denying operation by the player for the advertisement display, and the selection operation for the advertisement display size are received (step S34). As a result, the offer display control data 720 (see FIG. 24) is generated in the play data 700. In the configuration where a numerical value such as the given quantity, the increased amount, the multiplier, or the like is determined with a function in the standard reward data 555 (see FIG. 16), the value is determined at this timing. If no operation input is detected within a predetermined period of time after the offer display section 10 has been started to be displayed, displaying of the advertisement is automatically regarded as being denied.

When the advertisement display is confirmed (YES in step S36), the server system 1100 cancels the displaying of the offer display section 10, deletes the offer display control data 720, and instead starts to display the advertisement display 12 for the advertisement selected in step S32 (step S38, see FIG. 4). As a result, the advertisement display control data 722 is generated in the play data 700, and the watched amount and the obtained reward start to be sequentially updated.

In the present embodiment, the watched amount is a rate of the elapsed time after the start of the displaying to the time required for displaying the currently displayed advertisement.

The determined reward is decided by referring to the reward defining data 550 (see FIG. 16) indicated by the applied reward ID 540 (see FIG. 13) in the advertisement defining data 520 corresponding to the advertisement to be displayed, and by referring to the reward change setting data 560 in the defining data. The obtained reward is initialized with the standard reward data 555 at the display start point. Whether the change executing conditions 561 (see FIG. 17) in the reward change setting data 560 are satisfied is sequentially determined until the advertisement display is completed or the watching stop operation is input. The change in the changed content 563 corresponding to the satisfied change executing condition 561 is applied to the obtained reward. When the obtained reward starts to be updated, the reward giving notification display control data 724 is prepared in the play data 700, and the reward giving notification setting data 565 corresponding to the satisfied change executing condition 561 is accumulated to be used later for displaying the changed reason notification section 35 in the reward giving notification 30. A configuration where the sequential updating of the obtained reward is omitted may be employed.

When the advertisement display 12 that has been started to be displayed is entirely watched (YES in step S50) or when the watching stop operation by the player is detected before the advertisement display is completed (YES in step S52), the server system 1100 terminates the advertisement display 12 (step S54).

Then, the server system 1100 determines a reward for watching the current advertisement (step S56). In the present embodiment, the obtained reward has started to be sequentially updated in step S38, whereby the determination can be made by simply reading the information on the obtained reward from the advertisement display control data 722. In the configuration where the sequential updating of the obtained reward is omitted, the reward is determined in this step with the standard reward data 555 changed in accordance with a change in the changed content 563 corresponding to the satisfied change executing condition 561.

Then, the server system 1100 performs the control to give the reward thus determined to the player (step S58). As a result, new reward acquisition history data 732 (see FIG. 24) is generated in the play data 700.

Then, the server system 1100 displays the reward giving notification 30 (step S60), and terminates the reward advertisement process.

Referring back to FIG. 26, the server system 1100 then displays a menu on the user terminal 1500 (step S70). In the present embodiment, the contents of the menu displayed, which can be set as appropriate, includes "online shopping", "friend management", "equipment change/item management (for player character)", "play start", and "logout". Note that other elements such as "chat with friend" may be added as appropriate.

When an operation to select the "online shopping" on the menu screen is detected (YES in step S80), the server system 1100 executes the online shopping process for implementing the online shopping (step S82), and executes the reward advertisement process (step S84). A configuration where the reward advertisement process in step S84 is performed before the online shopping process in step S82 may be employed.

When an operation to select "friend management" on the menu screen is detected (YES in step S90), the server system 1100 performs a friend management process to register or delete a friend (step S92), and performs the reward advertisement process (step S94). A configuration where the reward advertisement process in step S94 is performed before the online shopping process in step S92 may be employed.

When an operation to select "equipment change/item management" on the menu screen is detected (YES in step S100), the server system 1100 executes an equipment change/item management process for implementing various types of management for changing the equipment of the player character or item selection, reorganization, fusion, or the like (step S102), and performs the reward advertisement process (step S104). A configuration where the reward advertisement process in step S104 is performed before the equipment change/item management process in step S102 may be employed.

Referring to FIG. 27, when an operation to select "play start" on the menu screen is detected (YES in step S110), the server system 1100 starts the game progress control for implementing actual game play using a player character (step S112), and repeatedly performs the reward advertisement process (step S114) as long as the game play is not terminated (NO in step S116).

When the game play is terminated (YES in step S116), the system server 1100 updates the save data 620 (see FIG. 23), the advertisement watching history data 612, and the reward acquisition history data 630 in the user management data 600 on the player (step S118). The advertisement watching history data 612 and the reward acquisition history data 630 are updated based on the advertisement watching history data 730 and the reward acquisition history data 732 in the play data 700.

The server system 1100 performs the reward advertisement process (step S120).

When an operation to select "logout" on the menu screen is detected (YES in step S122), the server system 1100 performs a logout process for the player (step S124) to terminate a series of processes related to the player.

With the present embodiment described above, the content of the reward for watching the advertisement given to a player can be changed in accordance with various aspects. Specifically, the reward can be changed in accordance with a status at the advertisement offer timing (substantially the same as the advertisement display timing), the watched amount of the advertisement not fully watched, how the game was played in the past, what kind of charge was made in the past, or the like. Thus, even when the same advertisement is displayed, the content of the reward to be actually given to the player changes in accordance with the current status or an immediately preceding status, whereby the player can be incentivized to watch the reward advertisement.

The advertisement offer is determined at a timing suitable for the content of the advertisement and at a timing enabling the player to also focus on the game play, instead of being fixed or being randomly determined, whereby advertisements more effectively than conventional cases can be achieved.

Second Embodiment

Next, a second embodiment of the present invention is described.

The present embodiment is implemented to be basically the same with the first embodiment, but is different from the first embodiment in that the user terminal 1500 performs the game management process. Components that are the same as the counterparts in the first embodiment are denoted with the same reference numerals, and the description thereof will be omitted.

FIG. 29 is a functional block diagram illustrating an example of a functional configuration of a user terminal 1500B according to the present embodiment. The user terminal 1500B according to the present embodiment is a computer system in which the game screen display control section 272 and the sound play control section 273 are omitted and the game management section 220 is provided instead. Specifically, the user terminal 1500B according to the present embodiment does not acquire data for displaying a game screen image or data for playing sounds from the server system 1100, but performs a calculation process related to the game management to perform the game progress control, and thus generates images of the game screen and an advertisement and controls the sound play therefor.

FIG. 30 is a diagram illustrating an example of a program and data stored in the terminal storage section 500 in the user terminal 1500B according to the present embodiment. The terminal storage section 500 according to the present embodiment stores therein the terminal system program 502 and the game program 506. Thus, as the user terminal 1500B processes the game management section 220, the game initial setting data 510, the category association level defining data 512, the advertisement database 514, the reward defining data 550, and the play data 700 are stored in the terminal storage section 500.

The game program 506 is a program that causes the terminal processing section 200 to implement the user terminal calculation section 270 and the game management section 220 according to the present embodiment.

A flow of the process according to the present embodiment is basically the same as the flow of the process (see FIG. 26 to FIG. 28) performed by the server system 1100 according to the first embodiment. The user terminal 1500B implements the game management section 220, and thus the subject of each step may be changed to the user terminal 1500B as appropriate. When the user terminal 1500B performs a process requiring the user management data 600 to be referred to/changed, the server system 1100 is requested to provide required data, perform matching, or the like or may be requested to perform the entire process as appropriate.

The present embodiment can provide the same advantageous effect as the first embodiment. The user terminal 1500B may be partially in charge of the functions of the game management section 220, instead of being entirely in charge of the functions.

[Modifications]

The embodiments to which the invention is applied have been described above. Note that the invention is not limited thereto. Various modifications may be appropriately made, such as adding other elements, omitting some of the elements, or changing some of the elements.

[First Modification]

For example, in the example according to the first embodiment, the entire game system is implemented with a client-server system. However, this should not be construed in a limiting sense. For example, a computer system in which a plurality of user terminals 1500 can establish a peer-to-peer (P2P) connection may be implemented for a battle game. Specifically, the server system 1100 provides data as a matching result to the user terminals 1500 matched by the server system 1100, and then the user terminals establish the P2P connection. One of the user terminals 1500 is in charge of the functions of the game management section 220. Alternatively, a plurality of user terminals 1500 may cooperate to implement the functions.

[Second Modification]

The system according to the examples described in the embodiments described above includes the server system 1100 and the plurality of user terminals 1500. Alternatively, the present invention may be similarly applied to a game system including a single computer. For example, the present invention may be applied to a single game device.

Specifically, FIG. 31 is an outer front view illustrating an example of a configuration of an arcade game device 1300 employing the present invention. The arcade game device 1300 includes a casing main body 1301 provided with operation input units, used by the player to input operations, including: a joystick 1302; a button switch 1304; and a touch panel 1306 that functions as an image display device and as a touch position input device. The casing main body 1301 is further provided with a speaker 1310, a player image capturing camera 1320, a payment device 1330, a medium reading device 1344 for writing and reading data to and from an electronic payment medium 6, and a control board 1350.

The control board 1350 includes various processors (e.g., a CPU 1351, GPU, and A DSP), various IC memories 1352 (e.g., a VRAM, a RAM, and a ROM), a communication device module 1353 for establishing communication connection with the communication line 9, an I/F controller 1357 (interface controller), and the like.

For example, the I/F controller 1357 includes 1) a driver circuit for the touch panel 1306, 2) a circuit that receives a signal from the joystick 1302 and the button switch 1304, 3) an output amplifier circuit that outputs a sound signal to the speaker 1310, 4) a circuit that reads image data on an image captured by the player image capturing camera 1320, 5) a circuit for outputting and receiving a signal to and from the payment device 1330 and the medium reading device 1344, and the like.

The elements mounted on the control board 1350 are electrically connected to each other through a bus circuit or the like so that the elements can exchange data and signals. The control board 1350 may be partially or entirely implemented with an ASIC, FPGA, or SoC.

The control board 1350 executes the game program to perform the calculation process, and controls each sections of the arcade game device 1300 to enable the game play in accordance with an operation input with the joystick 1302, the button switch 1304, and the touch panel 1306. The arcade game device 1300 has a required program and various types of setting data in the IC memory 1352 in advance. Alternatively, the program and the data may be downloaded from an external device each time the system is booted.

The control board 1350 performs control so that the arcade game device 1300 sequentially transmits the result of the operation input using the joystick 1302, the touch panel 1306, or the like to the server system 1100 and receives the various types of data for playing the game from the server system 1100. The image of the game screen is generated and displayed on the touch panel 1306, and the sound signal corresponding to the sound effects and an operation sound is generated and emitted from the speaker 1310. Thus, the player can enjoy the game play by operating the joystick 1302 while watching the game screen displayed on the touch panel 1306 and listening to the game sound from the speaker 1310.

In this configuration, the functions of the server system 1100 and the user terminal 1500 according to the first embodiment are implemented with the arcade game device 1300 alone.

Note that the user management data 600 may be stored in the server system 1100 as in the first and the second embodiments, and data may be acquired and updated with the arcade game device 1300 issuing a request to the server system 1100 each time the acquisition or the updating is required.

[Third Modification]

In the embodiments described above, only a single advertisement is offered at a single advertisement offer timing. Alternatively, a configuration of offering a plurality of advertisements in such a status may be employed.

Specifically, as in a reward advertisement process B illustrated in FIG. 32, the step S32 (see FIG. 28) for selecting any one of the advertisement satisfying the timing condition 524 is omitted. Thus, a configuration of performing the loop A (steps S33 to S62) for each advertisement satisfying the timing condition 524 may be employed.

In this configuration, the player can freely select and watch the advertisement he or she wants to watch. This provides an opportunity for the sponsors to have an advertisement with a length suitable for the player's mood and status selected. Thus, the sponsor can prepare a plurality of movie advertisements for the same product and with different watching times (for example, 15 seconds and 90 seconds), and may set different standard rewards and the same timing condition 524 to the advertisements. Thus, the player can select and watch the advertisement with preferable watching time at the same advertisement offer timing. Thus, the advertisement is more likely to be watched.

[Fourth Modification]

The configurations described in the embodiments described above uniquely set the detail of the standard reward for each advertisement. Alternatively, a configuration where the player can set the detail may be employed.

Specifically, as illustrated in FIG. 33, in the configuration, a total watching time point 613 is automatically updated each time the advertisement watching history data 612 is added. The total time the advertisement has been watched by the player in the past may be directly used as the point, or the point may be calculated based on the total time.

As illustrated in FIG. 34, a plurality of pieces of standard reward option defining data 554 are prepared in the reward defining data 550. The pieces of defining data each include standard reward data 555, a selectable condition 556, and a to-be-given reward notification content 557, and are set to be different from each other in the content of the standard reward data 555 and the selectable condition 556.

The selectable condition 556 is a condition related to the advertisement watching history of the player in the past. For example, the condition may be defined with the consumption of the total watching time point 613, the number of the advertisements that has been watched in the advertisements listed in the target advertisement ID list 552 or the amount of the already-watched advertisement, and the like. In the illustrated example, an example of an AND condition of these two elements is employed. Alternatively, an OR condition may be employed.

The value of the content of the standard reward is preferably increased for the selectable condition 556 that is relatively more difficult to satisfy (for example, "100% of advertisements listed in the target advertisement ID list 552 has been watched" as illustrated in FIG. 34).

For example, the content of the standard reward of the selectable condition 556 that is relatively difficult to satisfy may be preferably be a combination of a plurality of or all of the contents of the standard rewards of the selectable conditions 556 that are relatively easy to satisfy.

As illustrated in FIG. 35, a used point amount designation section 16 for the total watching time point 613 is added to the offer display section 10. In step S34 (see FIG. 28), control may be implemented including: receiving a used amount designation operation performed with the used point amount designation section 16; selecting one standard reward option defining data 554 satisfying the selectable condition 556 based on the designated used amount; and switching the display of the corresponding to-be-given reward notification content 557. Note that the content of the standard reward determined in this step is based on the standard reward data 555 of the corresponding standard reward option defining data 554.

[Fifth Modification]

Furthermore, a configuration of setting the content of the standard reward may be set to that involving lottery (for example, a lottery for determining whether or not to give the standard reward, or setting the ability parameter value of the character, serving as the standard reward, is set to be especially higher when the player wins the lottery).

This configuration is described based on the first embodiment for example. Specifically, as illustrated in FIG. 36, a giving possibility setting section 248 is provided. The giving possibility setting section 248 variably set the chance of winning the lottery described above (that is a possibility of the reward being given to the player) based on the watching time and/or the number of watched times of the advertisement in step S34. Then, the standard reward may be determined with a lottery process performed based on the chance of winning thus set. This can be similarly applied to the second embodiment.

The chance of winning (possibility of the player obtaining an advantageous result) is preferably set to be higher for the standard reward obtained with the selectable condition 556 that is relatively difficult to satisfy. It is a matter of course that this setting may be the other way around.

What is claimed is:

1. A computer system comprising: at least one processor or circuit programmed to execute as:
    starting a game based on a game play start operation by a player;
    managing a user data on the player, the user data including a charge history of purchasing by the player of an item usable by a player character of the player in the game, wherein the charge history is information on one or more of number of charge times the player purchased the item, a total charge amount for purchases of the item by the player, charge frequency for how frequently the player purchased the item, preference of purchased items purchased by the player, playing fee paid by the player, and event participation fee paid by the player for an event ticket;
    performing display control that determines whether the charge history of the player currently satisfies a predetermined charge condition, and then selects a given reward advertisement in the game which has a predetermined advertisement defining data that is predetermined to correspond to the charge history, wherein the predetermined charge condition is a condition of one or more of a total charge amount for purchases of the item, a total charge amount for event participation, a total number of charged times for purchasing an item or event, a total charge amount for a current accounting period, a total number of charged times for the current accounting period, and a frequently purchased category of an item purchased by the player, wherein the reward advertisement features a corresponding predetermined reward given to a user in exchange for watching the reward advertisement;
    setting a reward in the game in exchange for watching the reward advertisement; and
    giving the reward to the player.

2. The computer system as defined in claim 1, the setting the reward including:
    setting a standard reward for watching the reward advertisement; and
    setting the reward to be actually given by changing the standard reward.

3. The computer system as defined in claim 2 further comprising notifying the player of a content of the change.

4. The computer system as defined in claim 2 further comprising notifying the player of a reason of the change.

5. The computer system as defined in claim 2 further comprising performing control displaying of the reward advertisement based on a watching stop operation performed by the player, before the reward advertisement is entirely displayed,
the setting the reward to be actually given includes setting the reward to be actually given in accordance with a watched amount of the reward advertisement, after the display control for the reward advertisement.

6. The computer system as defined in claim 5 further comprising performing display control for a display indicating the current watched amount and a reward given when the watching stop operation is performed.

7. The computer system as defined in claim 2 further comprising: presenting the standard reward to offer the player to watch the reward advertisement; and
starting the display control for the reward advertisement when the player performs a confirmation operation for the offer.

8. The computer system as defined in claim 2, the setting the standard reward including setting the standard reward based on the play information on the user data.

9. The computer system as defined in claim 2, the setting the standard reward including setting the standard reward to be predetermined reward associated with the reward advertisement,
the setting the reward to be actually given including setting the reward to be actually given by changing the standard reward based on the user data.

10. A game system comprising: a server system that is the computer system according to claim 1 and
a user terminal to which the player inputs an operation, the server system and the user terminal being connected to the game system to be capable of performing a communication with each other.

11. A game device comprising an operation input section to which the player inputs an operation, the game device being the computer system according to claim 1.

12. A computer system comprising: at least one processor or circuit programmed to execute as:
starting a game based on a game play start operation by a player;
managing a user data on the player, the user data including a play history of the game played by the player, wherein the play history is information on one or more of number of charge times the player purchased the item, a total charge amount for purchases of the item by the player, charge frequency for how frequently the player purchased the item, preference of purchased items purchased by the player, playing fee paid by the player, and event participation fee paid by the player for an event ticket;
performing display control that determines whether the play history of the player currently satisfies a predetermined charge condition, and then selects a given reward advertisement in the game which has a predetermined advertisement defining data that is predetermined to correspond to the play history, wherein the predetermined charge condition is a condition of one or more of a total charge amount for purchases of the item, a total charge amount for event participation, a total number of charged times for purchasing an item or event, a total charge amount for a current accounting period, a total number of charged times for the current accounting period, and a frequently purchased category of an item purchased by the player, wherein the reward advertisement features a corresponding predetermined reward given to a user in exchange for watching the reward advertisement;
setting a reward in the game played by the player in exchange for watching the reward advertisement; and
giving the reward to the player.

* * * * *